United States Patent
Teixeira et al.

[11] Patent Number: 5,953,239
[45] Date of Patent: Sep. 14, 1999

[54] COMPUTER SIMULATION OF PHYSICAL PROCESSES

[75] Inventors: Christopher M. Teixeira, Cambridge; Hudong Chen, Newton; Kim Molvig, Concord, all of Mass.

[73] Assignee: Exa Corporation, Lexington, Mass.

[21] Appl. No.: 08/998,768

[22] Filed: Dec. 29, 1997

[51] Int. Cl.⁶ .................................................. G06F 19/00
[52] U.S. Cl. .......................................... 364/578; 364/512
[58] Field of Search .................................. 364/578, 512; 395/500

[56] References Cited

U.S. PATENT DOCUMENTS

| | | | |
|---|---|---|---|
| 4,809,202 | 2/1989 | Wolfram | 364/578 |
| 4,989,166 | 1/1991 | Akasaka et al. | 364/578 |
| 5,038,302 | 8/1991 | Kaufman | 364/522 |
| 5,255,212 | 10/1993 | Kondoh et al. | 364/578 |
| 5,377,129 | 12/1994 | Molvig et al. | 364/378 |
| 5,408,638 | 4/1995 | Sagawa et al. | 395/500 |
| 5,432,718 | 7/1995 | Molvig et al. | 364/578 |
| 5,594,671 | 1/1997 | Chen et al. | 364/578 |
| 5,606,517 | 2/1997 | Traub et al. | 364/578 |
| 5,640,335 | 6/1997 | Molvig et al. | 364/578 |
| 5,802,353 | 9/1998 | Avila et al. | 395/500 |

FOREIGN PATENT DOCUMENTS

WO 92/01993   2/1992   WIPO ........................ G06F 15/60

OTHER PUBLICATIONS

Anagnost et al., "Digital Physics—Analysis of the Morel Body in Ground Proximity," SAE International Congress & Exposition, Detroit, MI (Feb. 24–27, 1997), No. 970139.

Chopard and Droz, "Cellular Automata Model for Heat Conduction in a Fluid," Physics Letters A, vol. 126, No. 8,9 (Jan. 25, 1988), pp. 476–480.

Exa Corporation, Digital Physics Technology: Principles & Applications, Cambridge, MA, pp. 1–14 (Aug. 1994).

Exa Corporation, Understanding Fluid CAD: ExaResolute Product Technical Description, Cambridge, MA, pp. 1–39 (Aug. 29, 1994).

*Primary Examiner*—Kevin J. Teska
*Assistant Examiner*—A. S. Roberts
*Attorney, Agent, or Firm*—Fish & Richardson PC

[57] ABSTRACT

A physical process is simulated by storing in a memory state vectors for voxels. The state vectors include entries that correspond to particular momentum states of possible momentum states at a voxel. Iinteraction operations are performed on the state vectors. The interaction operations model interactions between elements of different momentum states. For a particular state vector, the interaction operations include performing energy-exchanging interaction operations that model interactions between elements of different momentum states that represent different energy levels. A rate factor for the voxel represented by the particular state vector affects a degree to which energy-exchanging interaction operations cause a transfer of elements from states representing lower energy levels to states representing higher energy levels, rather than from states representing higher energy levels to states representing lower energy levels. Move operations then are performed on the state vectors to reflect movement of elements to new voxels. The rate factor is generated for a voxel based on rate factors for voxels from which elements of the voxel moved.

20 Claims, 11 Drawing Sheets

COMPUTER SIMULATION OF PHYSICAL PROCESSES

BACKGROUND

This invention relates to computer simulation of physical processes, such as fluid flow.

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). More recently, the differential equation approach has been replaced with what is generally known as lattice gas (or cellular) automata, in which the macroscopic-level simulation provided by solving the Navier-Stokes equations is replaced by a microscopic-level model that performs operations on particles moving between sites on a lattice.

The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a lookup table, which performs a permutation on the bits (e.g., transforming the 110000 to 001100). Particles then are moved to adjoining sites (e.g., the two particles moving along the Y axis would be moved to neighboring sites to the left and right along the Y axis).

Molvig et al. taught an improved lattice gas technique in which, among other things, many more bits were added to the state vector at each lattice site (e.g., 54 bits for subsonic flow) to provide variation in particle energy and movement direction, and collision rules involving subsets of the full state vector were employed. Molvig et al., PCT/US91/04930; Molvig et al., "Removing the Discreteness Artifacts in 3D Lattice-Gas Fluids", Proceedings of the Workshop on Discrete Kinetic Theory, Lattice Gas Dynamics, and Foundations of Hydrodynamics, World Scientific Publishing Co., Pty., Ltd., Singapore (1989); Molvig et al., "Multi-species Lattice-Gas Automata for Realistic Fluid Dynamics", Springer Proceedings in Physics, Vol. 46, Cellular Automata and Modeling of Complex Physical Systems, Springer-Verlag Berlin, Heidelberg (1990). These improvements and others taught by Molvig et al. produced the first practical lattice-gas computer system. Discreteness artifacts that had made earlier lattice gas models inaccurate at modeling fluid flow were eliminated.

Chen et al. taught an improved simulation technique in U.S. Pat. No. 5,594,671, "COMPUTER SYSTEM FOR SIMULATING PHYSICAL PROCESSES USING MULTIPLE-INTEGER STATE VECTORS", which is incorporated by reference. Instead of the lattice gas model in which at each lattice site, or voxel (these two terms are used interchangeably throughout this document), there is at most a single particle in any momentum state (e.g., at most a single particle moving in a particular direction with a particular energy), the system used a multi-particle technique in which, at each voxel, multiple particles could exist at each of multiple states (e.g., in an eight-bit implementation, 0–255 particles could be moving in a particular direction). The state vector, instead of being a set of bits, was a set of integers (e.g., a set of eight-bit bytes providing integers in the range of 0 to 255), each of which represented the number of particles in a given state. Thus, instead of being limited to a single particle moving in each direction at each momentum state, the system had the flexibility to model multiple particles moving in each direction at each momentum state.

Chen et al.'s use of integer state vectors made possible much greater flexibility in microscopic modeling of physical processes because much more variety was possible in the collision rules that operated on the new integer state vectors. The multi-particle technique provided a way of achieving the so-called microscopic Maxwell-Boltzmann statistics that are characteristic of many fluids.

The Chen et al. system also provided a way of simulating the interaction between fluid particles and solid objects using a new "slip" technique that extended the simulation only to the outer surface of the boundary layer around a solid object, and not through the boundary layer to the surface of the solid object. At the outer surface of the boundary layer, the collision rules governing interactions between particles and the surface allowed particles to retain tangential momentum.

Chen et al. employed both "slip" and "bounce back" collision techniques in combination to simulate surfaces with a range of skin friction, from the very high skin friction of pure "bounce back" to the very low skin friction provided by "slip". Varying fractions of the particles were treated with "bounce back" rules, and the remainder were treated with "slip" rules. The multi-particle model of Chen et al. accommodated arbitrary angular orientation of the solid boundary with respect to the lattice by allowing use of a weighted average of multiple outgoing states to assure that the average momentum of the outgoing particles was in a direction closely approximating true specular reflection.

Chen et al. described techniques for preserving energy, mass and momentum normal to the solid boundary. Momentum normal to the solid boundary was preserved using a "pushing/pulling" technique that compared the overall incoming normal momentum to the overall outgoing normal momentum and recorded the normal surplus or deficit (i.e., the amount of normal momentum that had to be made up in some way that did not introduce artifacts into the simulation). Chen et al. then used a set of pushing/pulling rules to drive the normal surplus toward zero. Particles were moved from certain states to other states so that only normal momentum was affected.

Changes in energy were accommodated by a "cooling" (or heating) technique that used a total energy counter to keep track of an energy surplus (or deficit) and cooling/heating rules to drive the surplus toward zero. Similarly, "dieting" rules were used to remove any surplus mass that accumulated as the result of one or more of the collision rules.

SUMMARY

The invention provides an improved technique for simulating the effects of temperature in a computer system for simulating a physical process. In general, the temperature at a voxel may be simulated by the portion of elements at a voxel that occupy higher energy states relative to a portion that occupy lower energy states. A higher temperature voxel will have a larger portion of high energy elements than will a lower temperature voxel. The effects of temperature may be simulated by controlling a rate at which energy-exchanging interaction operations cause elements to move from lower energy state to higher energy states. The ability of the system to simulate temperature effects may be improved by basing a rate factor used in controlling the rate for a particular voxel from rate factors for voxels from which elements of the particular voxel moved.

The improved technique promises to improve the ability of simulation systems to simulate temperature effects. By, in effect, moving these temperature effects between voxels, the temperature stability of the simulation may be improved.

In one general aspect, the invention features storing in a memory state vectors for voxels. The state vectors include entries that correspond to particular momentum states of possible momentum states at a voxel. Interaction operations that model interactions between elements of different momentum states are performed on the state vectors, and move operations are performed on the state vectors to reflect movement of elements to new voxels. For a particular state vector, the interaction operations include performing energy-exchanging interaction operations that model interactions between elements of different momentum states that represent different energy levels. A rate factor for the voxel represented by the particular state vector affects a degree to which energy-exchanging interaction operations cause a transfer of elements from states representing lower energy levels to states representing higher energy levels, rather than from states representing higher energy levels to states representing lower energy levels. The rate factor for the represented voxel is generated based on rate factors for voxels from which elements of the represented voxel moved.

Embodiments may include one or more of the following features. The rate factor may be generated using spatial information (e.g., a gradient) of a previous rate factor for a previous time increment for the represented voxel. This gradient of the previous rate factor may be generated using an upwind differencing technique based on a velocity at the represented voxel. Higher order methods also may be used. Using the upwind differencing technique may include generating the gradient using the rate factors for voxels from which elements of the represented voxel moved. The gradient of the previous rate factor may be weighted based on a velocity at the represented voxel.

Generating the rate factor may include generating a current rate factor for the represented voxel for a current time increment and combining the current rate factor with a previous rate factor for a previous time increment. Contributions to the rate factor made by the current rate factor may be weighted using a relaxation parameter. The previous rate factor may be the rate factor for the previous time increment for the represented voxel. The current rate factor may be generated using an approximated temperature defined as the ratio of an energy of the represented voxel to two times a density of the represented voxel. Other technique for generating the rate factor and approximating the temperature also may be used.

Generating the rate factor may further include combining the current rate factor with the previous rate factor and with a gradient of the previous rate factor for the previous time increment for the represented voxel. The gradient of the previous rate factor may be generated based on a velocity at the represented voxel. The gradient of the previous rate factor may be generated using an upwind differencing technique based on a velocity at the represented voxel. The gradient may be generated using the rate factors for voxels from which elements of the represented voxel moved.

A single rate factor may be generated for a collection of voxels. For example, the collection of voxels may be microblock that includes eight adjacent voxels arranged in a cubic configuration.

In addition to being based on the rate factors for other voxels, the rate factor for a voxel may be related to one or more fluid properties at the voxel. For example, the rate factor may be related to a temperature at the voxel, or to other properties (e.g., mass, momentum, or energy) at the voxel.

The invention may be implemented as part of the PowerFLOW™ software product available from Exa Corporation of Lexington, Mass. The PowerFLOW™ product is a software-only implementation of Exa's DIGITAL PHYSICS™ technology. The PowerFLOW™ product has been implemented on Ultra™ Workstations and Ultra Enterprise™ systems available from Sun Microsystems. However, the techniques described here are not limited to any particular hardware or software configuration. They may find applicability in any computing or processing environment that may be used for simulating a physical process. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described and to generate output information. The output information is applied to at least one output device.

Each program is preferably implemented in a high level procedural or object oriented programming language to communicate with a computer system. However, the programs can be implemented in assembly or machine language, if desired. In any case, the language may be a compiled or interpreted language.

Preferably, each such computer program is stored on a storage medium or device (e.g., CD-ROM, hard disk or magnetic diskette) that is readable by a general or special purpose programmable computer for configuring and operating the computer to perform the procedures described in this document. The system also may be considered to be implemented as a computer-readable storage medium, configured with a computer program, where the storage medium so configured causes a computer to operate in a specific and predefined manner.

The disclosures of U.S. Pat. No. 5,640,335, "COLLISION OPERATORS IN PHYSICAL PROCESS SIMULATION"; U.S. Pat. No. 5,606,517, "VISCOSITY REDUCTION IN PHYSICAL PROCESS SIMULATION"; and U.S. Pat. No. 5,377,129, "PARTICLE INTERACTION PROCESSING SYSTEM" are incorporated by reference.

Other features and advantages of the invention will be apparent from the following detailed description, including the drawings, and from the claims.

DESCRIPTION

A. Model Simulation Space

Figure 1:
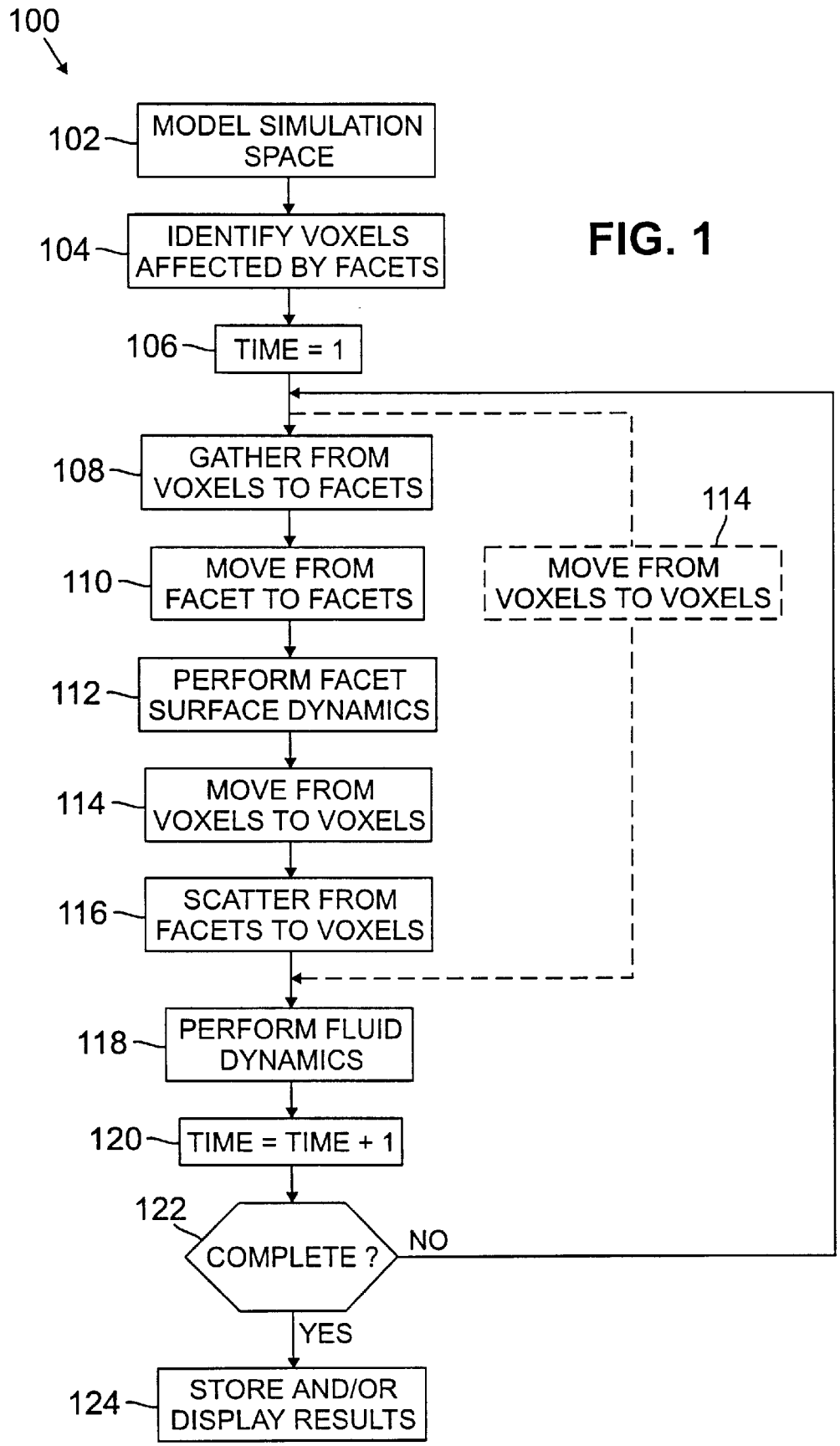
FIG. 1 is a flow chart of a procedure followed by a physical process simulation system.

Referring to FIG. 1, a physical process simulation system operates according to a procedure 100 to simulate a physical process such as fluid flow. Prior to the simulation, a simulation space is modeled as a collection of voxels (step 102). Typically, the simulation space is generated using a computer-aided-design (CAD) program. For example, a CAD program could be used to draw an automobile positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v.$$

The characteristic length of an object represents large scale features of the object. For example, if flow around an automobile were being simulated, the height of the automobile might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $N_i(x, t)$, where $N_i$ represents the number of elements, or particles, per unit volume in state i (i.e., the density of particles in state i) at a lattice site denoted by the three-dimensional vector x at a time t. For a known time increment, the number of particles is referred to simply as $N_i(x)$. The combination of all states of a lattice site is denoted as $N(x)$.

The number of states is determined by the number of energy levels and the number of possible velocity vectors within each energy level. The velocity vectors consist of integer linear speeds in a space having four dimensions: x, y, z and w. The fourth dimension, w, is projected back onto three-dimensional space and thus does not indicate an actual velocity in the three-dimensional lattice. For subsonic mono-species flows, i ranges from 0 to 53. The number of states is increased for transonic flows or multiple-species simulations.

Each state i represents a different velocity vector at a specific energy level (i.e., energy level zero, one or two). The velocity $c_i$ of each state is indicated with its "speed" in each of the four dimensions as follows:

$$c_i = (c_x, c_y, c_z, c_w).$$

The energy level zero state represents stopped particles that are not moving in any dimension, i.e., $c_{stopped} = (0,0,0,0)$. Energy level one states represent particles having a +/−1 speed in two of the four dimensions and a zero speed in the other two dimensions. Energy level two states represent particles having either a +/−1 speed in all four dimensions, or a +/−2 speed in one of the four dimensions and a zero speed in the other three dimensions.

Generating all of the possible permutations of the three energy levels gives a total of 49 possible states (one energy level zero state, 24 energy level one states, 24 energy level two states). However, the subsonic flow state space maintains a total of six energy level zero states, also referred to as "rest" states, as opposed to one, giving a total of 54 states. The six rest states are employed to ensure that there are a sufficient number of rest "slots". Of course, this same effect could be achieved by increasing the number of bits in the entry corresponding to the rest state in a 49 entry embodiment.

In summary, each voxel (i.e., each lattice site) is represented by a state vector N(x). The state vector completely defines the status of the voxel and includes 54 multi-bit entries, each of which corresponds to an integer value. The 54 entries correspond to the six rest states, 24 directional vectors at energy level one and 24 directional vectors at energy level two. By using multi-bit entries, the system can produce Maxwell-Boltzmann statistics for an achieved equilibrium state vector.

Figure 2:
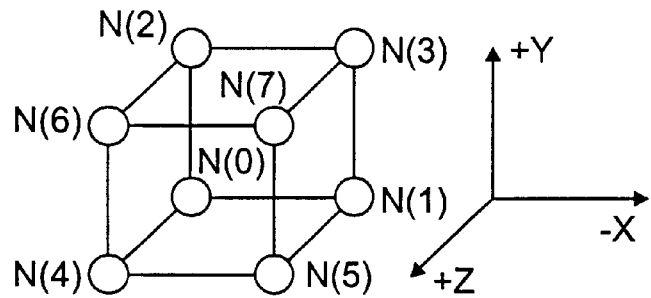
FIG. 2 is a perspective view of a microblock.

For processing efficiency, the voxels may be grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and n ∈ {0,1,2, ..., 7}. A microblock is illustrated in FIG. 2.

Figure 3A:
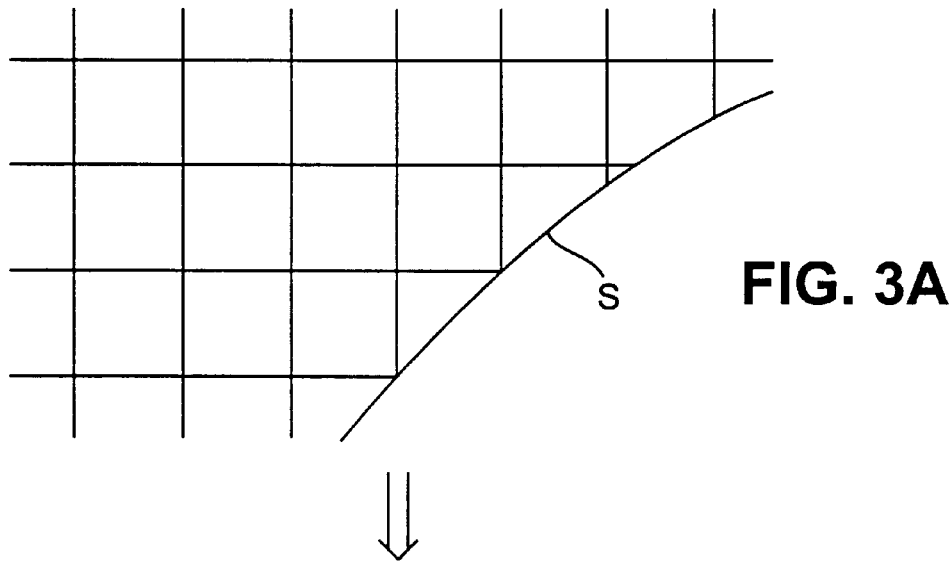
FIGS. 3A and 3B are illustrations of lattice structures used by the system of FIG. 1.
Figure 3B:
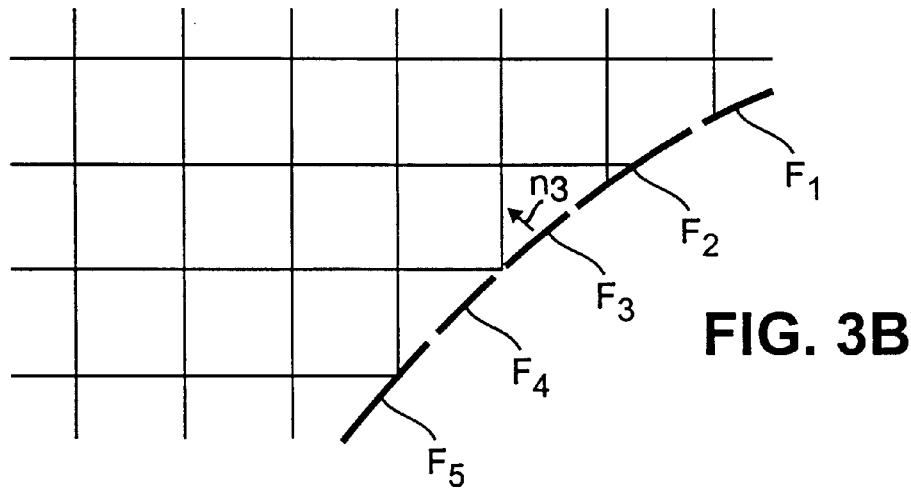

Referring to FIGS. 3A and 3B, a surface S (FIG. 3A) is represented in the simulation space (FIG. 3B) as a collection of facets $F_\alpha$:

$$S = \{F_\alpha\}$$

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($N_i(\alpha)$) that describes the surface dynamic properties of the facet.

Figure 4:
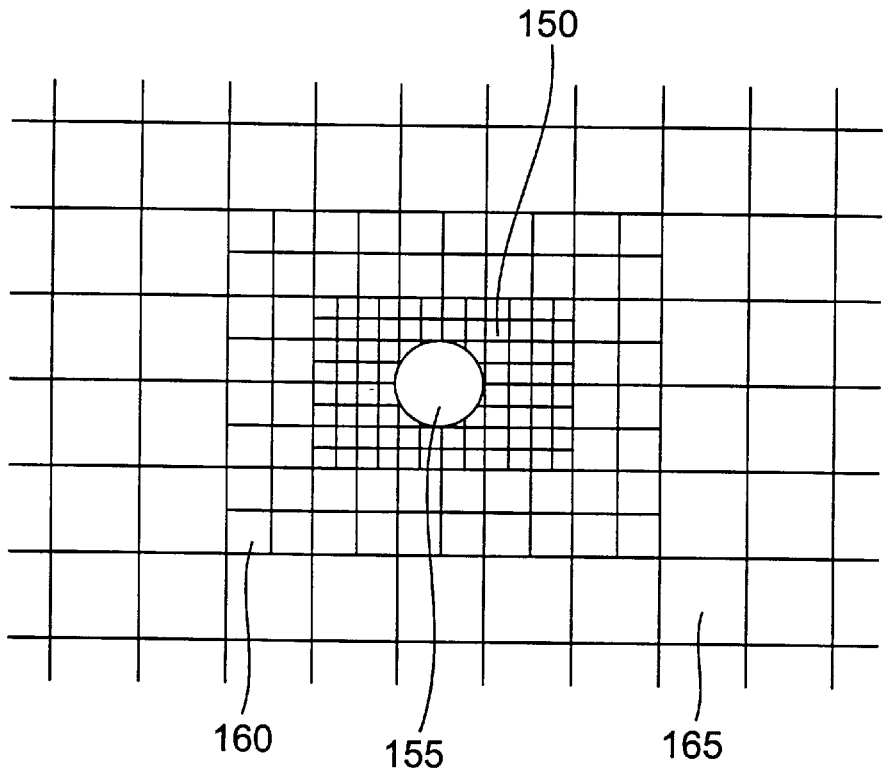
FIGS. 4 and 5 illustrate variable resolution techniques.
Figure 5:
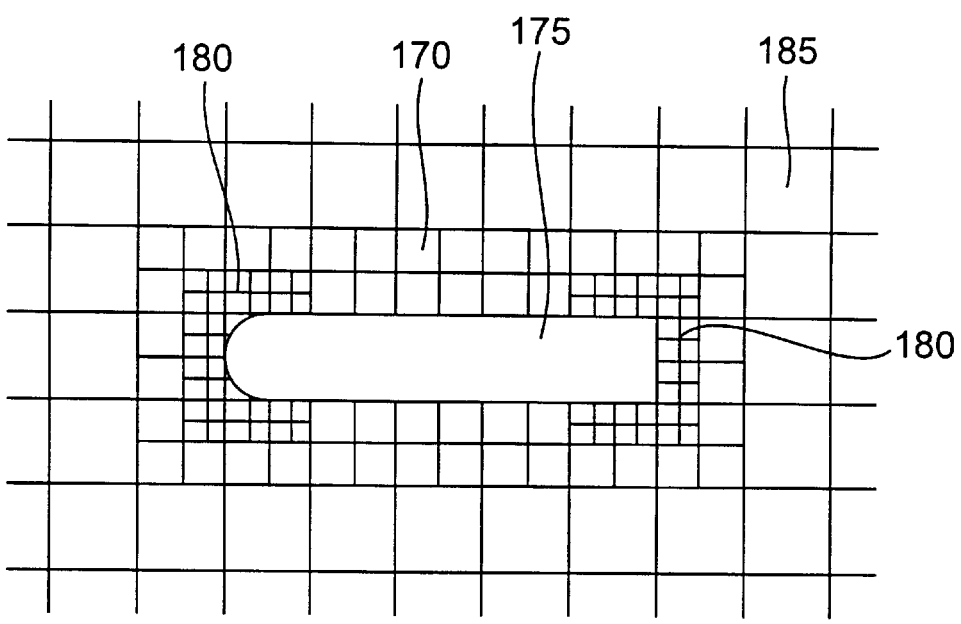

Referring to FIG. 4, different levels of resolution may be used in different regions of the simulation space to improve processing efficiency. Typically, the region 150 around an object 155 is of the most interest and is therefore simulated with the highest resolution. Because the effect of viscosity decreases with distance from the object, decreasing levels of resolution (i.e., expanded voxel volumes) are employed to simulate regions 160, 165 that are spaced at increasing distances from the object 155. Similarly, as illustrated in FIG. 5, a lower level of resolution may be used to simulate a region 170 around less significant features of an object 175 while the highest level of resolution is used to simulate regions 180 around the most significant features (e.g., the leading and trailing surfaces) of the object 175. Outlying regions 185 are simulated using the lowest level of resolution and the largest voxels. Techniques for processing interactions between voxels of different sizes are discussed by Molvig et al. in U.S. Pat. No. 5,377,129, which is incorporated herein by reference, at col. 18, line 58 to col. 28, line 21. Techniques for processing interactions between voxels of different sizes and the facets of a surface are discussed below.

B. Identify Voxels Affected by Facets

Referring again to FIG. 1, once the simulation space has been modeled (step 102), voxels affected by one or more facets are identified (step 104). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_{71}(x)$ equals one.

Voxels that interact with one or more facets by transferring particles to the facet or receiving particles from the facet also are identified as voxels affected by the facets. All voxels that are intersected by a facet will include at least one state that receives particles from the facet and at least one state that transfers particles to the facet. In most cases, additional voxels also will include such states.

Figure 6:
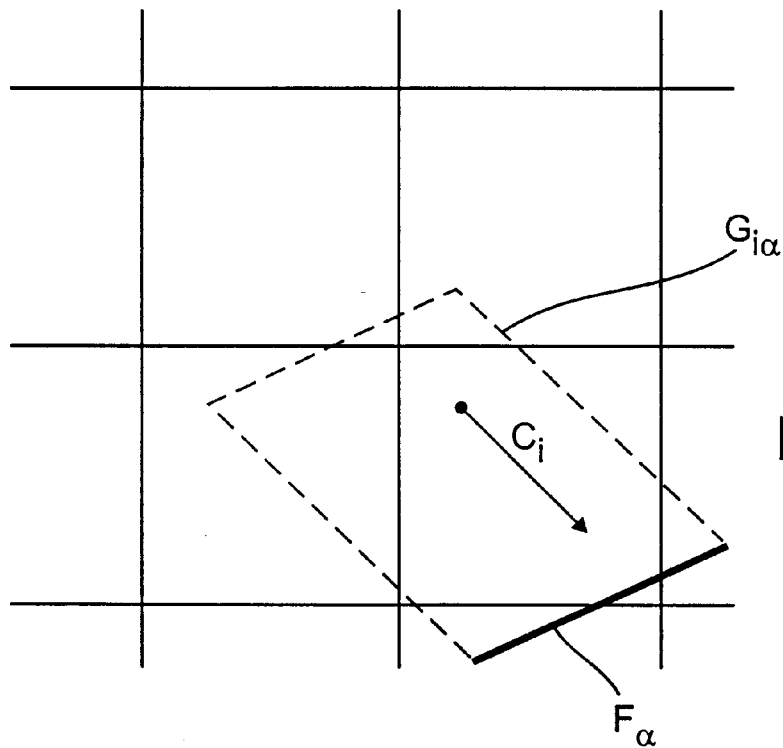
FIG. 6 illustrates regions affected by a facet of a surface.

Referring to FIG. 6, for each state I having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i \cdot n_\alpha|$) and a base defined by the surface area $A_\alpha$ of the facet so that the volume $V_{i\alpha}$ of the parallelepiped $G_{i\alpha}$ equals:

$$V_{i\alpha} = |c_i \cdot n_\alpha| A_\alpha.$$

The facet $F_\alpha$ receives particles from the volume $V_{i\alpha}$ when the velocity vector of the state is directed toward the facet ($c_i \cdot n_\alpha < 0$), and transfers particles to the region when the velocity vector of the state is directed away from the facet ($c_i \cdot n_\alpha > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of whole or partial voxels overlapped depends on the size of the facet relative to the size of the voxels, the energy of the state, and the orientation of the facet relative to the lattice structure. The number of affected voxels increases with the size of the facet. Accordingly, as noted above, the size of the facet typically is selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state I particles that move between a voxel N(x) and a facet $F_\alpha$ equals the density of state I particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x).$$

When the parallelepiped $G_{i\alpha}$ is intersected by one or more facets, the following condition is true:

$$V_{i\alpha} = \sum_x V_{i\alpha}(x) + \sum_\beta V_{i\alpha}(\beta),$$

where the first term accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \sum_x V_{i\alpha}(x).$$

C. Perform Simulation

Once the voxels that are affected by one or more facets are identified (step 104), a timer is initialized to begin the simulation (step 106). During each time increment of the simulation, movement of particles from voxel to voxel is simulated by an advection stage (steps 108–116) that accounts for movement of the particles between voxels and interactions of the particles with surface facets. Next, a collision stage (step 118) simulates fluid dynamics resulting from the interaction of particles within each voxel. Thereafter, the timer is incremented (step 120). If the incremented timer does not indicate that the simulation is complete (step 122), the advection and collision stages (steps 108–120) are repeated. If the incremented timer indicates that the simulation is complete (step 122), results of the simulation are stored and/or displayed (step 124).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 108). As noted above, the flux of state I particles between a voxel $N(x)$ and a facet $F_\alpha$ is:

$$\Gamma_{i\alpha}(x)=N_i(x)V_{i\alpha}(x).$$

From this, for each state I directed toward a facet $F_\alpha$ ($c_i \cdot n_\alpha < 0$), the number of particles provided to the facet $F_\alpha$ by the voxels is:

$$\Gamma_{i\alpha V \to F} = \sum_x \Gamma_{i\alpha}(x) = \sum_x N_i(x)V_{i\alpha}(x).$$

Only voxels for which $V_{i\alpha}(x)$ has a non-zero value must be summed. As noted above, the size of the facets are selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move from Facet to Facet

Figure 8:
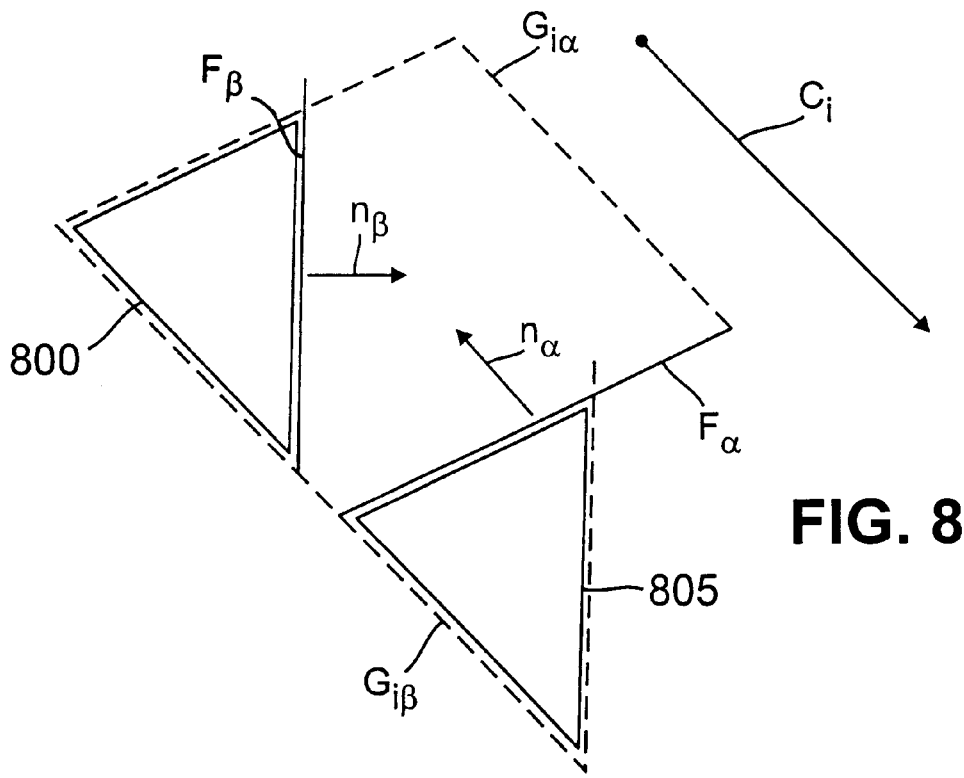
FIG. 8 illustrates movement of particles from a surface to a surface.

Next, particles are moved between facets (step 110). If the parallelepiped $G_{i\alpha}$ for an incoming state ($c_i \cdot n_\alpha < 0$) of a facet $F_\alpha$ is intersected by another facet $F_\beta$, then a portion of the state I particles received by the facet $F_\alpha$ will come from the facet $F_\beta$. In particular, facet $F_\alpha$ will receive a portion of the state I particles produced by facet $F_\beta$ during the previous time increment. This relationship is illustrated in FIG. 8, where a portion 800 of the parallelepiped $G_{i\alpha}$ that is intersected by facet $F_\beta$ equals a portion 805 of the parallelepiped $G_{i\beta}$ that is intersected by facet $F_\alpha$. As noted above, the intersected portion is denoted as $V_{i\alpha}(\beta)$. Using this term, the flux of state I particles between a facet $F_\beta$ and a facet $F_\alpha$ may be described as:

$$\Gamma_{i\alpha}(\beta,t-1)=\Gamma_i(\beta)V_{i\alpha}(\beta)/V_{i\alpha},$$

where $\Gamma_i(\beta,t-1)$ is a measure of the state I particles produced by the facet $F_\beta$ during the previous time increment. From this, for each state I directed toward a facet $F_\alpha$ ($c_i \cdot n_\alpha < 0$), the number of particles provided to the facet $F_\alpha$ by the other facets is:

$$\Gamma_{i\alpha F \to F} = \sum_\beta \Gamma_{i\alpha}(\beta) = \sum_\beta \Gamma_i(\beta, t-1)V_{i\alpha}(\beta)/V_{i\alpha}$$

and the total flux of state I particles into the facet is:

$$\Gamma_{iIN}(\alpha) = \Gamma_{i\alpha V \to F} + \Gamma_{i\alpha F \to F} = \sum_x N_i(x)V_{i\alpha}(x) + \sum_\beta \Gamma_i(\beta, t-1)V_{i\alpha}(\beta)/V_{i\alpha}.$$

The state vector $N(\alpha)$ for the facet, also referred to as a facet distribution function, has 54 entries corresponding to the 54 entries of the voxel state vectors. The input states of the facet distribution function $N(\alpha)$ are set equal to the flux of particles into those states divided by the volume $V_{i\alpha}$:

$$N_i(\alpha)=\Gamma_{iIN}(\alpha)/V_{i\alpha},$$

for $c_i \cdot n_\alpha < 0$.

The facet distribution function is a simulation tool for generating the output flux from a facet, and is not necessarily representative of actual particles. To generate an accurate output flux, values are assigned to the other states of the distribution function. Outward states are populated using the techniques described above for populating the inward states:

$$N_i(\alpha)=\Gamma_{iOTHER}(\alpha)/V_{i\alpha},$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$)). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t)=\Gamma_{iOUT}(\alpha, t-1).$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$) and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0,0,0,2) and (0,0,0,-2)) are initialized at the beginning of the simulation based on initial conditions for temperature and pressure. These values are then adjusted over time.

4. Perform Facet Surface Dynamics

Figure 9:
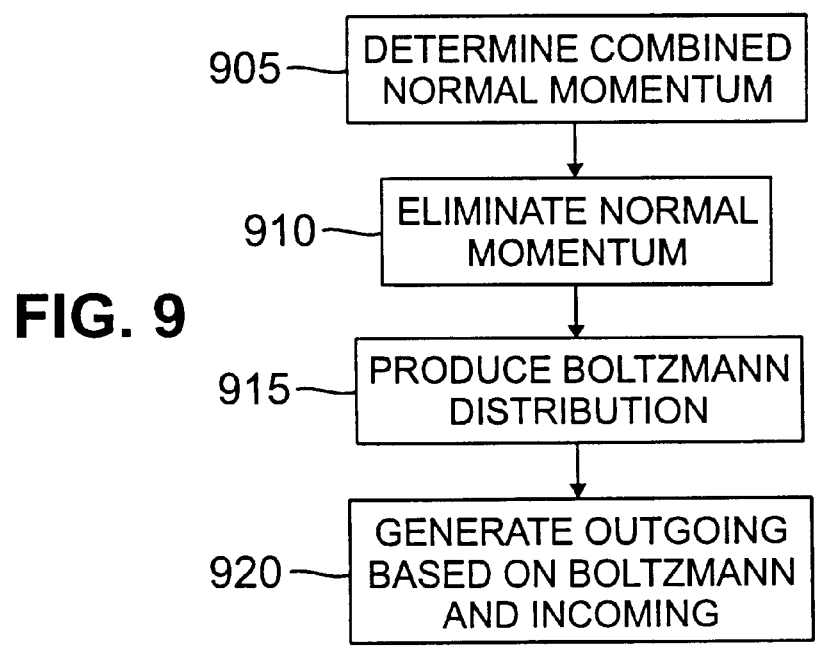
FIG. 9 is a flow chart of a procedure for performing surface dynamics.

Next, surface dynamics are performed for each facet to satisfy the four boundary conditions discussed above (step 112). A procedure for performing surface dynamics for a facet is illustrated in FIG. 9. Initially, the combined momentum normal to the facet $F_\alpha$ is determined (step 905) by determining the combined momentum $P(\alpha)$ of the particles at the facet as:

$$P(\alpha) = \sum_i c_i * N_i^\alpha,$$

for all I. From this, the normal momentum $P_n(\alpha)$ is determined as:

$$P_n(\alpha)=n_\alpha \cdot P(\alpha).$$

This normal momentum is then eliminated using a pushing/pulling technique described by Chen et al. (step 910) to produce $N_{n-}(\alpha)$. According to this technique, particles are moved between states in a way that affects only normal momentum. The pushing/pulling technique is described by Chen et al. in U.S. Pat. No. 5,594,671, which is incorporated by reference.

Thereafter, the particles of $N_{n-}(\alpha)$ are collided to produce a Boltzmann distribution $N_{n-B}(\alpha)$ (step 915). As described below with respect to performing fluid dynamics, a Boltzmann distribution may be achieved by applying a set of collision rules to $N_{n-}(\alpha)$.

An outgoing flux distribution for the facet $F_\alpha$ is then determined (step 920) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha)=\Gamma_{iIN}(\alpha)-N_{n-Bi}(\alpha)V_{i\alpha}.$$

Using this difference, the outgoing flux distribution is:

$$\Gamma_{iOUT}(\alpha)=N_{n-Bi}(\alpha)V_{i\alpha}-\Delta\Gamma_{i^*}(\alpha),$$

for $n_\alpha \cdot c_i > 0$ and where I* is the state having a direction opposite to state I. For example, if state I is (1,1,0,0), then state I* is (−1,−1,0,0). To account for skin friction and other factors, the outgoing flux distribution may be further refined to:

$$\Gamma_{iOUT}(\alpha) = N_{n-Bi}(\alpha)V_{i\alpha} - \Delta\Gamma_{i^*}(\alpha) + C_f(n_\alpha \cdot c_i)[N_{n-Bi^*}(\alpha) - N_{n-Bi}(\alpha)]V_{i\alpha} +$$
$$(n_\alpha \cdot c_i)(t_{1\alpha} \cdot c_i)\Delta N_{j,1} V_{i\alpha} + (n_\alpha \cdot c_i)(t_{2\alpha} \cdot c_i)\Delta N_{j,2} V_{i\alpha},$$

for $n_\alpha \cdot c_i > 0$, where $C_f$ is a function of skin friction, $t_{1\alpha}$ is a first tangential vector is perpendicular to $n_\alpha$, $t_{2\alpha}$ is a second tangential vector that is perpendicular to both $n_\alpha$ and $t_{1\alpha}$, and $\Delta N_{j,1}$ and $\Delta N_{j,2}$ are distribution functions corresponding to the energy (i) of the state I and the indicated tangential vector. The distribution functions are determined according to:

$$\Delta N_{j,1,2} = -\frac{1}{2j^2}\left(n_\alpha \cdot \sum_i c_i c_i N_{n-Bi}(\alpha) \cdot t_{1,2\alpha}\right),$$

where j equals 1 for energy level one states and 2 for energy level two states.

The first and second terms of the equation for $\Gamma_{iOUT}(\alpha)$ enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin friction to enforce a desired change in tangential momentum flux on the surface. Generation of the friction coefficient $C_f$ is described below. Note that all terms involving vector manipulations are geometric factors that may be calculated prior to beginning the simulation.

An alternative approach that employs floating point numbers may be used to generate $\Gamma_{iOUT}(\alpha)$. According to this approach, the normal momentum is determined as:

$$P_n(\alpha) = n_\alpha \cdot P(\alpha).$$

From this, a tangential velocity is determined as:

$$u_t(\alpha) = (P(\alpha) - P_n(\alpha)n_\alpha)/\rho,$$

where $\rho$ is the density of the facet distribution:

$$\rho = \sum_i N_i(\alpha).$$

A temperature T of the facet distribution then is determined as:

$$T = \left[\sum_i jN_i(\alpha) - \frac{1}{2}\rho u_t \cdot u_t\right] / 2\rho$$

where j equals 0, 1 or 2 and corresponds to the energy of the state I. The Boltzmann distribution then is determined using $u_t$ and T as:

$$N_{n-Bi}(\alpha) =$$

-continued
$$\langle N\rangle_j^{(eq)}\left[1 + \frac{c_i \cdot u_t}{T} + \frac{1}{2}\left(\frac{c_i \cdot u_t}{T}\right)^2 - \frac{u_t \cdot u_t}{2T} + \frac{1}{6}\left(\frac{c_i \cdot u_t}{T}\right)^3 - \left(\frac{c_i \cdot u_t}{T}\right)\left(\frac{u_t \cdot u_t}{2T}\right)\right]$$

where $$\langle N\rangle_j^{(eq)} (j=0,1,2)$$

is the equilibrium isotropic state population at energy level j:

$$\langle N\rangle_0^{(eq)} = \frac{\rho}{d_o}[1 - 3T(1-T)]$$

$$\langle N\rangle_1^{(eq)} = \frac{\rho}{12}T(2 - 3T)$$

$$\langle N\rangle_2^{(eq)} = \frac{\rho}{24}T(3T - 1),$$

and $d_0$ is the number of rest states (i.e., six). The equilibrium state populations may be determined using the density and temperature of a single voxel or may be determined using the average density and temperature for a microblock.

As before, the difference between the incoming flux distribution and the Boltzmann distribution is determined as:

$$\Delta\Gamma_i(\alpha) = \Gamma_{iIN}(\alpha) - N_{n-Bi}(\alpha)V_{i\alpha}.$$

The outgoing flux distribution then becomes:

$$\Gamma_{iOUT}(\alpha) = N_{n-Bi}(\alpha)V_{i\alpha} - \Delta\Gamma_{i^*}(\alpha) + C_f(n_\alpha \cdot c_i)[N_{n-Bi^*}(\alpha) - N_{n-Bi}(\alpha)]V_{i\alpha},$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = p_\alpha n_\alpha A_\alpha - C_f \rho_\alpha u_\alpha A_\alpha,$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i,c_{ji} \cdot n_\alpha < 0} \Gamma_{\alpha ji IN} - \sum_{i,c_{ji} \cdot n_\alpha > 0} \Gamma_{\alpha ji OUT}$$

where the index j denotes the energy of the state I. This energy difference then is used to generate a difference term:

$$\delta\Gamma_{\alpha ji} = V_{i\alpha}\Delta\Gamma_{\alpha mj} / \sum_{i,c_{ji} \cdot n_\alpha < 0} V_{i\alpha}$$

for $c_{ji} n_\alpha > 0$. This difference term is used to modify the outgoing flux so that the flux becomes:

$$\Gamma_{\alpha ji OUT_f} = \Gamma_{\alpha ji OUT} + \delta\Gamma_{\alpha ji}$$

for $c_{ji} n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 1, particles are moved between voxels along the three-dimensional rectilinear lattice (step 114). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the four dimensions: x, y, z and w. The integer speeds include: 0, +/−1, and +/−2. The sign of the speed indicates the direction in which a particle is moving along the corresponding axis. These linear speeds support simulation of particles with energy levels ranging from zero to four. Only energy levels zero to two are needed for subsonic flow simulations, while all five are needed for transonic flow simulations.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1,1,0,0) is moved from its current voxel to one that is +1 over in the x direction and +1 up in the y direction. The particle ends up at its destination voxel with the same state it had before the move (1,1,0,0). Interactions within the voxel will likely change the particle count for that state based on local interactions with other particles and surfaces. If not, the particle will continue to move along the lattice at the same speed and direction.

It should be noted here that particles in the stopped states (energy level zero) do not get moved. In addition, the particles only get moved in three dimensions. Non-zero values in the w dimension of a state do not affect the determination of a lattice site to which the state's particles are to be moved. For example, an energy level one particle with a −1z and a +1w speed (0,0,−1,1) and an energy level one particle with a −1z and a −1w (0,0,−1,−1) speed would both move to a site that is −1 away in the z dimension. There also are two energy level two states that do not get moved at all: (0,0,0,2) and (0,0,0,−2).

Figure 7:
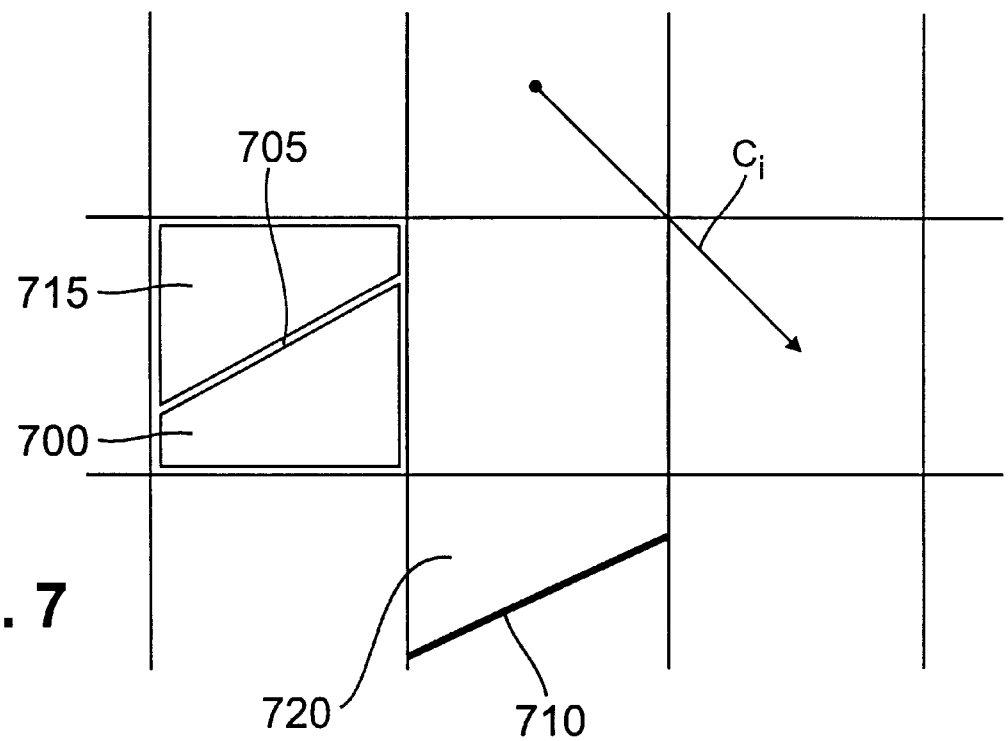
FIG. 7 illustrates movement of particles from a voxel to a surface.

The move operation becomes slightly more complicated for voxels that interact with one or more surfaces. As noted above, $V_{i\alpha}(x)$ and $P_f(x)$ may have non-integer values. This can result in one or more fractional particles being transferred to a facet. Transfer of such fractional particles to a facet results in fractional particles remaining in the voxels. These fractional particles are transferred to a voxel occupied by the facet. For example, referring to FIG. 7, when a portion 700 of the state I particles for a voxel 705 is moved to a facet 710 (step 108), the remaining portion 715 is moved to a voxel 720 in which the facet 710 is located and from which particles of state I are directed to the facet 710. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state I particles transferred to a voxel N(f) occupied by one or more facets is:

$$N_i(f) = N_i(x)\left(1 - \sum_\alpha V_{i\alpha}(x)\right)$$

where N(x) is the source voxel. Because $N_i(f)$ may be a real number, $N_i(f)$ is temporarily stored in a buffer as a floating point number or a scaled integer until the advection stage is completed.

To store $N_i(f)$ as a scaled integer, $N_i(f)$ is determined as:

$$N_i(f) = \text{floor}\left[\left(N_{si}(x)\left(\text{scale} - \sum_\alpha V_{si\alpha}(x)\right) + \text{rand}\right)/\text{scale}\right]$$

where scale is a constant having a value of $2^{16}$ and $N_{si}(x)$ and $V_{si\alpha}(x)$ are, respectively, $N_i(x)$ and $V_{i\alpha}(x)$ multiplied by scale. The random number rand takes on values between zero and one prior to scaling, and is then scaled up by scale to values between 0 and $2^{16}-1$. The operator floor then produces an integer value. In particular, floor returns the largest integer that is less than or equal to its argument. For example, floor(2.3) equals 2 and floor(−2.3) equals −3.

6. Scatter from Facets to Voxels

Next, the outgoing particles from each facet are scattered to the voxels (step 116). Essentially, this step is the reverse of the gather step by which particles were moved from the voxels to the facets. The number of state I particles that move from a facet $F_\alpha$ to a voxel N(x) is:

$$N_{\alpha i F \to V} = \frac{1}{P_f(x)} V_{\alpha i}(x) \Gamma_{\alpha i OUT_f} / V_{\alpha i},$$

where $P_f(x)$ accounts for the volume reduction of partial voxels. From this, for each state I, the total number of particles directed from the facets to a voxel $N_{(x)}$ is:

$$N_{iF \to V} = \frac{1}{P_f(x)} \sum_\alpha V_{\alpha i}(x) \Gamma_{\alpha i OUT_f} / V_{\alpha i}.$$

To maintain the entries of the state vectors for the voxels as integers (and to convert non-integer entries back to integer form), the entries are rounded to integer values:

$$N_i(x, t_s+) = \text{floor}[(\text{scale}(N_i(x, t_s-) + N_{iF \to V}(x)) + \text{rand})/\text{scale}]$$

where $t_{s-}$ is the time just before the scatter step, $t_{s+}$ is the time just after the scatter step, and $N_i(x, t_s-)$ is a floating point number. The random number rand takes on values between zero and one prior to scaling, and is then scaled up by scale to values between 0 and $2^{16}-1$. Because the values are scaled up by scale, the division by scale is merely a matter of shifting the result of the multiplication and addition operations.

After scattering particles from the facets to the voxels, combining them with particles that have advected in from surrounding voxels, and integerizing the result, certain states in certain voxels may either underflow (become negative) or overflow (exceed 255 in an eight-bit implementation or 65,535 in a sixteen-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. By only adding mass to the same energy states, both mass and energy are corrected when the mass counter reaches zero. The additional momentum resulting from this addition of mass and energy is accumulated and added to the momentum from the truncation. The momentum then is corrected using pushing/pulling techniques to return the momentum accumulator to zero.

7. Perform Fluid Dynamics

After the advection stage completes, the collision stage performs fluid dynamics (step 118), which also may be referred to as microdynamics or intravoxel operations (where the advection procedure may be referred to as intervoxel operations). The microdynamics operations described below also may be used to collide particles at a facet to produce a Boltzmann distribution at the facet.

In one approach, the microdynamics operations simulate the set of physical interactions that occur within a voxel by sequentially applying a series of binary, trinary, or "n"ary interaction rules (also referred to as collision rules) to the state vector of a voxel during each time increment. For example, in one implementation, there are 276 collision rules, each of which is implemented in a separate collision stage. Since the collision rules are applied sequentially, the result of their application has a complex nonlinear dependence on the initial state values that cannot be written simply in terms of those values. While the collision rules can represent binary, trinary, or "n"ary collision events, for simplicity and ease of understanding, the following discussion will refer primarily to binary collision events.

There are two basic types of collisions: non-energy-exchanging, "self" collisions and energy-exchanging collisions. Self collisions allow for particles to collide with each other, thus changing their velocity. Because the state occupied by a particle determines the particle's velocity, a change in a particle's velocity is accomplished by moving that particle into a different state. A binary collision rule describes a self collision with reference to two input states and two output states, and simulates the collision of one or more particles from each of the input states by moving the particles to the output states. Because the collision rules are bi-directional, the pair of states that will be input states and the pair of states that will be output states are determined at the time the collision takes place based on the states' populations.

Energy-exchanging collisions differ from self collisions in that the two outgoing particles are at different energy levels than the two incoming particles. For subsonic flows there are only three energy levels: zero (stopped), one and two. To conserve energy, the only possible energy-exchanging collisions occur when one pair of states includes two energy level one particles and the other pair of states includes an energy level two particle and a stopped particle. Energy-exchanging collisions do not happen at the same rate in both directions. Rather, they happen at a forward rate from the energy level one states and a backward rate from the energy level two and stopped states. As will be discussed in more detail below, these collision rates are dependent on the temperature of the system.

Each collision rule, whether directed to self or energy-exchanging collisions, operates on a subset of the states of the state vector for a single voxel or facet and simulates the net effect of collisions between particles in those states. For example, a binary collision rule operates on four states (I,j,k,l) and simulates the net effect of collisions between particles in the first two states (I,j) and collisions between particles in the second two states (k,l). Because a collision between a pair of particles in the first two states results in the velocities of those particles changing to the velocities corresponding to the second two states, and vice versa, a binary collision rule can be expressed as:

$$N_{scatt} = C(N_i(t), N_j(t), N_k(t), N_l(t))$$
$$N_i(t+\epsilon) = N_i(t) - N_{scatt}$$
$$N_j(t+\epsilon) = N_j(t) - N_{scatt}$$
$$N_k(t+\epsilon) = N_k(t) + N_{scatt}$$
$$N_l(t+\epsilon) = N_l(t) + N_{scatt}$$

where $\epsilon$ denotes the physically infinitesimal time required to perform the collision rule. Similarly, a trinary collision rule can be expressed as:

$$N_{scatt} = C(N_i(t), N_j(t), N_k(t), N_l(t), N_m(t), N_n(t))$$
$$N_i(t+\epsilon) = N_i(t) - N_{scatt}$$
$$N_j(t+\epsilon) = N_j(t) - N_{scatt}$$
$$N_k(t+\epsilon) = N_k(t) - N_{scatt}$$
$$N_l(t+\epsilon) = N_l(t) + N_{scatt}$$
$$N_m(t+\epsilon) = N_m(t) + N_{scatt}$$
$$N_n(t+\epsilon) = N_n(t) + N_{scatt}.$$

It should be appreciated that a state change resulting from application of a collision rule actually reflects a net state change. For example, when application of a collision rule results in four particles from each of states I and j moving to each of states k and l, this movement might actually represent collisions that resulted in, for example, fifty six particles from each of states I and j moving to each of states k and l, and fifty two particles from each of states k and l moving to each of states I and j.

To accurately simulate physical systems, each collision rule must conserve mass, momentum and energy. Because the rules simply move particles from one state to another, and do not create or destroy particles, they necessarily conserve mass. To ensure that a rule conserves momentum, the states affected by the rule are selected so that:

$$c_i + c_j = c_k + c_l.$$

Similarly, to ensure that a rule conserves energy, the states affected by the rule are selected so that:

$$c_i^2 + c_j^2 = c_k^2 + c_l^2.$$

Thus, the states I,j,k, and l are selected for each rule so that a pair of particles from states I and j has the same total momentum and energy as a pair of particles from states k and l. Because the incoming and outgoing pairs of states must always conserve mass, momentum and energy, not all possible quads within the 54 states correspond to a "legal" collision rule.

For a particular collision rule, $N_{scatt}$ is determined by applying a collision operator to the states affected by the rule. The arithmetic/computational form of the collision operator determines the practicality of implementing the operator in a simulation system. The statistical properties of the collision operator determine the extent to which accurate behavior can be achieved during a simulation.

The preferred collision operator is one for which $N_{scatt}$ approaches zero as the number of particles in each state affected by a rule approaches the Boltzmann equilibrium value for that state. For binary collisions, the collision operator may be expressed using a "multilinear rule", which has the following form:

$$N_{scatt} = A_j [R_f * N_i * N_j - R_b * N_k * N_l]$$

where $A_j$ is a collision coefficient and $R_f$ and $R_b$ are the forward and backward collision rates for energy exchanging collisions. The coefficient $A_j$ depends only on local temperature and density, while $R_f$ and $R_b$ depend only on local temperature. Since temperature and density do not change due to collisions, $A_j$, $R_f$ and $R_b$ are constants for a particular time increment, and can be determined prior to all collisions.

The value of $A_j$ varies for each type of collision (self collisions between particles at energy level one, self collisions between particles at energy level two, and energy exchanging collisions) as shown below. If j=1, 2 or $\epsilon$ represents, respectively, self collisions at energy levels one or two, and energy exchanging collisions, then:

$$A_j = \frac{1}{4\langle N \rangle_j^{(eq)}}, j = 1, 2; \text{ and}$$

$$A_\epsilon = \frac{1}{2R_f \langle N \rangle_1^{(eq)} + R_b(\langle N \rangle_0^{(eq)} + \langle N \rangle_2^{(eq)})}$$

where $$\langle N \rangle_j^{(eq)} (j=0,1,2)$$

is the equilibrium isotropic state population at energy level j, which, as described above, is determined from local densities and temperatures.

For energy exchanging collisions, states I and j are the energy level one states and states k and l are the energy level two and rest states so that $R_f/R_b$ represents the rate of collisions from energy level one particles to energy level two and rest particles. $R_f/R_b$, which also may be expressed as r, is defined as:

$$r = \frac{R_f}{R_b} = \frac{6}{d_0} \frac{(3T-1)[1-3T(1-T)]}{T(2-3T)^2}$$

where $d_0$ is the number of stopped particle states and equals six in the described implementation. The temperature of the fluid, however, is not necessarily constant over the length of a simulation, especially for simulations involving heat transfer, and $A_j$ and $R_f/R_b$ may be updated dynamically during the simulation to reflect changes in the local temperature. The temperature range supported for subsonic flows is between $\frac{1}{3}$ and $\frac{2}{3}$. For self collisions, $R_f/R_b$ equals one.

As an example of a self collision, the following initial state is proposed:

$c_i=(1,0,1,0)$, $N_i=25$, $c_j=(1,0,-1,0)$, $N_j=40$, $c_k=(1,0,0,1)$, $N_k=53$, and $c_l=(1,0,0,-1)$, $N_l=20$.

As shown, I,j,k and l are selected so that the combined momentum of states I and j and of states k and l are two in the x dimension and zero in the y,z and w dimensions, and so that each state is an energy level one state. Assuming that the total density $\rho$ is 1656 and the temperature is $\frac{1}{2}$, $\langle N \rangle_l^{(eq)}$ equals $\rho/48$ and $A_l$ equals $12/\rho$ or $\frac{1}{138}$. Using the multilinear rule results in an $N_{scatt}$ equal to $\frac{1}{138}$ (25 * 40-53 * 20) or −0.43478. For illustrative purposes, if the collision rule were applied using floating point numbers, the resulting state populations would have the following values:

$N_i=25-(-0.43478)=25.43478$, $N_j=40-(-0.43478)=40.43478$, $N_k=53+(-0.43478)=52.56522$, and $N_l=20+(-0.43478)=19.56522$.

These new values of $N_i$, $N_j$, $N_k$ and $N_l$ drive the equilibrium measure to zero:

$$(N_i * N_j - N_k * N_l) =$$
$$(25.43478 * 40.43478) - (52.56522 * 19.56522) =$$
$$1028.45 - 1028.45 = 0$$

A potential for overflow or underflow of a state's particle count exists in the collision operation described above. An overflow would result in a loss of mass, momentum and energy and would occur if the sum of the state population and $N_{scatt}$ exceeded 255 in an eight-bit implementation or 65,535 in a sixteen-bit implementation. By contrast, an underflow would result in creation of mass, momentum and energy and would occur if the result of subtracting $N_{scatt}$ from the state population was less than zero. Because the conservation of mass, momentum and energy is paramount in the simulation environment, an exchange of particles is prevented if the exchange would cause either an overflow or underflow in any of the states involved in the collision.

To avoid the use of floating point numbers in implementing the multilinear rule, $N^{scatt}$ may be determined for non-energy exchanging collisions as:

$$N_{scatt} = \text{floor}[\underline{A}_{js} * (N_i * N_j - N_k * N_l) + \text{rand}] / \text{scale}]$$

where $\underline{A}_{js}$ is $A_j$ scaled by multiplication by a constant, scale, that has a value of $2^{16}$. The random number rand takes on values between zero and one prior to scaling, and is then scaled up by scale to values between 0 and $2^{16}-1$. $N^{scatt}$ may be determined for energy exchanging collisions as:

$$N_{scatt} = \text{floor}[(R_f'*N_i*N_j - R_b'*N_k*N_l) + \text{rand}]/\text{scale}]$$

where $R_f'$ and $R_b'$ are, respectively, $R_f$ and $R_b$ multiplied by $A_{\epsilon s}$, which is $A_\epsilon$ multiplied by scale. Rand is employed to prevent introduction of statistical bias into the system by the truncation that results from the floor operation. Use of rand ensures that the floor operation, which forces $N_{scatt}$ to take on integer values, will not statistically bias $N_{scatt}$ in a particular direction.

With this approach, $N_{scatt}$ would equal 0 and the values of $N_i$, $N_j$, $N_k$ and $N_l$ for the example provided above would be set to (25, 40, 53, 20) with 56.522% probability and $N_{scatt}$ would equal 1 and the values would be set to (26, 41, 52, 19) with 43.478% probability. Averaged over a large number of trials, the mean values for $N_i$, $N_j$, $N_k$ and $N_l$ would be (25.43478, 40.43478, 52.56522, 19.56522), which correspond to the equilibrium values. Thus, though a single application of the rule does not necessarily drive the populations toward equilibrium, the statistical mean values of the populations over a large number of applications of the rule correspond to the equilibrium values for those populations.

The multilinear collision operator drives the simulated system to Boltzmann equilibrium. This means that repeated application of the collision rules drives the system to an equilibrium value where, for a given set of macroscopic conditions, the individual state populations, $N_i$, take on known values as determined by the Boltzmann distribution:

$$N_i = r_i e^{(\alpha m + \gamma m c_i + \beta \frac{1}{2} m c_i^2)}$$

where the factors in the exponent represent the conserved invariants of mass (m), momentum ($mc_i$) and energy ($mc_i^2$), it is assumed that no additional ("spurious") invariants occur, and $r_i$ represents a weighting factor generated from $R_f$ and $R_b$. Attainment of this distribution after each application of the collision rules will result in accurate hydrodynamic behavior.

A simple way to derive this equilibrium is to assume that all collisions have occurred and have driven the interacting states to their individual equilibria. Thus, for a binary collision rule, the equilibrium is:

$$R_f * N_i * N_j = R_b * N_k * N_l$$

and, for the multilinear rule, $N_{scatt}$ equals zero. Taking logarithms of both sides in the preceding equation implies:

$$\ln(r_i^{-1}N_i) + \ln(r_j^{-1}N_j) = \ln(r_k^{-1}N_k) + \ln(r_l^{-1}N_l)$$

where $$r_i^{-1} r_j^{-1} = R_f$$

and $$r_k^{-1} r_l^{-1} = R_b.$$

This equation now must be satisfied for all pairs of pairs, (or pairs of trios, etc.) that are allowed under the collision rules. To satisfy the equation, $\ln(r_i^{-1}N_i)$ must be a sum of summational invariants of the collision process (i.e., quantities whose sum over particles are conserved) in the following form:

$$\ln(r_i^{-1}N_i) = \sum_\alpha A_\alpha I_i^\alpha$$

where $I_i^\alpha$ is the αth invariant associated with state I, (e.g., a component of the momentum, $m_i c_i$, in the equation for $N_i$ above), and $A_\alpha$ are the coefficients associated with their corresponding invariants (e.g., α, β and γ in the equation for $N_i$ above). As long as the mass, momentum and energy are the only conserved quantities (i.e., there are no spurious invariants), then the Boltzmann distribution results from this equation.

D. Variable Resolution

Figure 10:
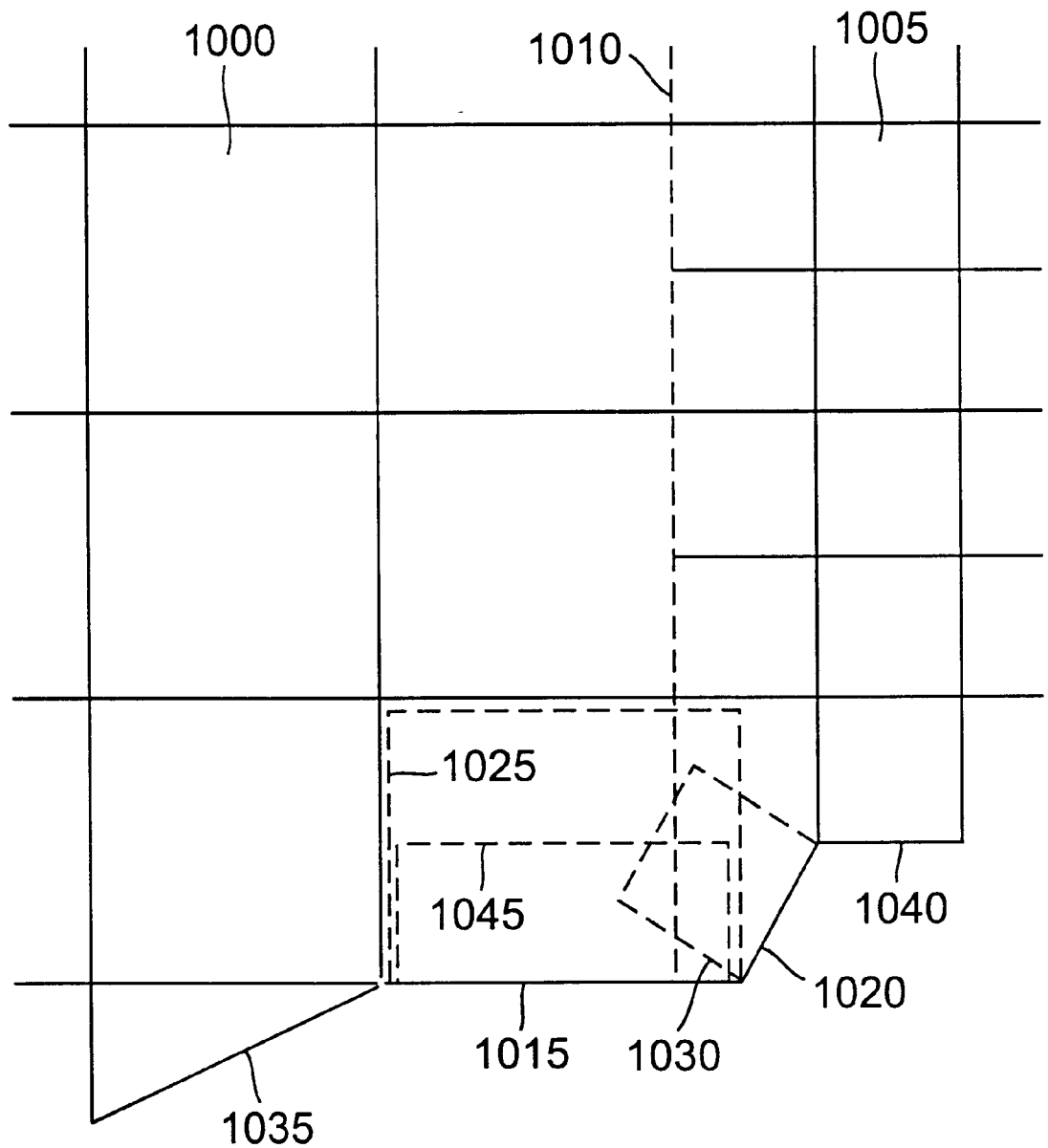
FIG. 10 illustrates an interface between voxels of different sizes.

Referring to FIG. 10, variable resolution (as illustrated in FIGS. 4 and 5 and discussed above) employs voxels of different sizes, hereinafter referred to as coarse voxels 1000 and fine voxels 1005. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1010.

When variable resolution is employed at or near a surface, facets may interact with voxels on both sides of the VR interface. These facets are classified as VR interface facets 1015 ($F_{\alpha IC}$) or VR fine facets 1020 ($F_{\alpha IF}$). A VR interface facet 1015 is a facet positioned on the coarse side of the VR interface and having a coarse parallelepiped 1025 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1020 is a facet positioned on the fine side of the VR interface and having a fine parallelepiped 1030 extending into a coarse voxel. Processing related to interface facets may also involve interactions with coarse facets 1035 ($F_{\alpha C}$) and fine facets 1040 ($F_{\alpha F}$).

For both types of VR facets, surface dynamics are performed at the fine scale, and operate as described above. However, VR facets differ from other facets with respect to the way in which particles advect to and from the VR facets.

Figure 11:
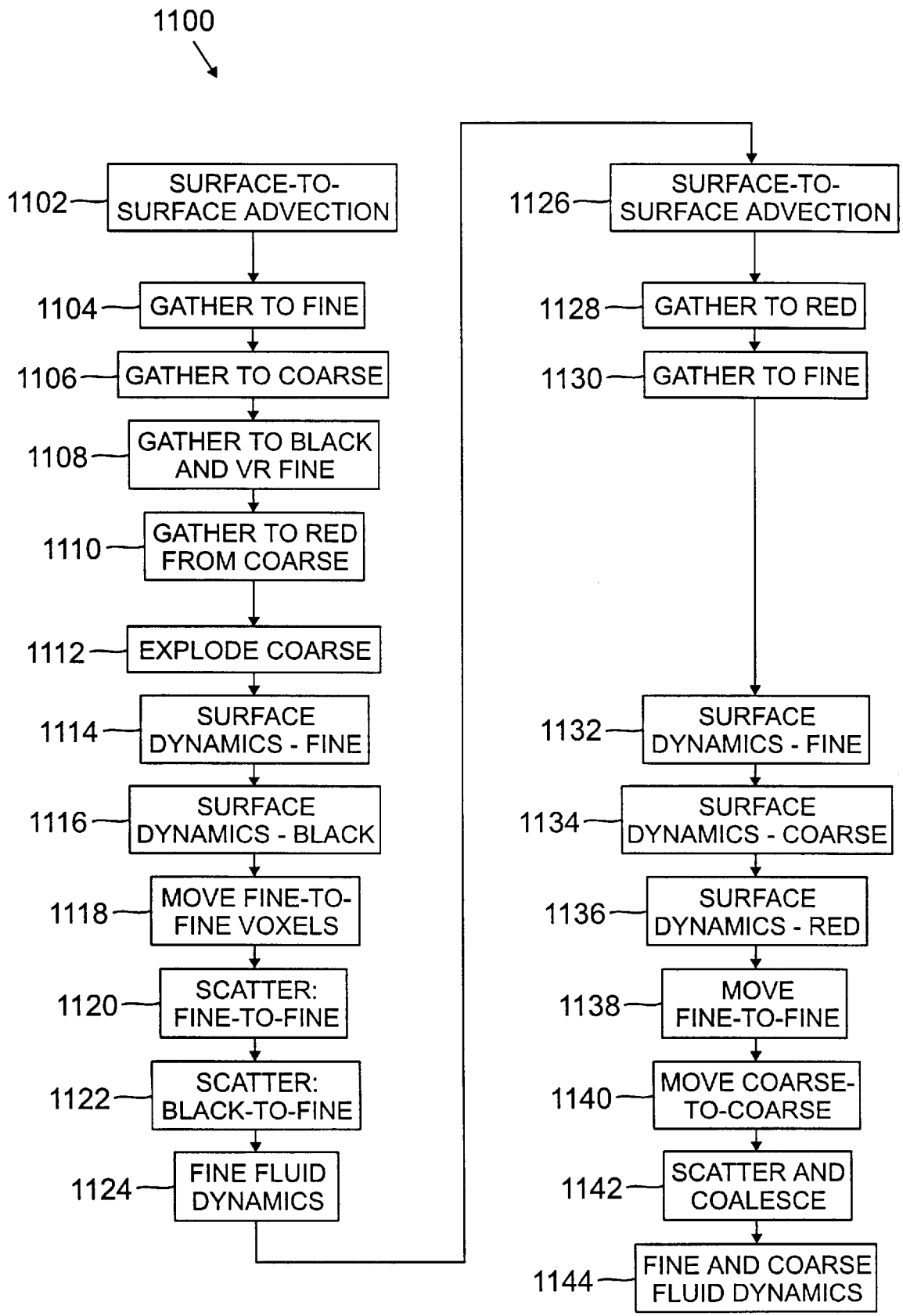
FIG. 11 is a flow chart of a procedure for simulating interactions with facets under variable resolution conditions.

Interactions with VR facets are handled using a variable resolution procedure 1100 illustrated in FIG. 11. Most steps of this procedure are carried out using the comparable steps discussed above for interactions with non-VR facets. The procedure 1100 is performed during a coarse time step (i.e., a time period corresponding to a coarse voxel) that includes two phases that each correspond to a fine time step. The facet surface dynamics are performed during each fine time step. For this reason, a VR interface facet $F_{\alpha IC}$ is considered as two identically sized and oriented fine facets that are referred to, respectively, as a black facet $F_{\alpha ICb}$ and a red facet $F_{\alpha ICr}$. The black facet $F_{\alpha ICb}$ is associated with the first fine time step within a coarse time step while the red facet $F_{\alpha ICr}$ is associated with the second fine time step within a coarse time step.

Initially, particles are moved (advected) between facets by a first surface-to-surface advection stage (step 1102). Particles are moved from black facets $F_{\alpha ICb}$ to coarse facets $F_{\beta C}$ with a weighting factor of $V_{-\alpha\beta}$ that corresponds to the volume of the unblocked portion of the coarse parallelepiped (FIG. 10, 1025) that extends from a facet $F_\alpha$ and that lies behind a facet $F_\beta$ less the unblocked portion of the fine parallelepiped (FIG. 10, 1045) that extends from the facet $F_\alpha$ and that lies behind the facet $F_\beta$. The magnitude of $c_i$ for a fine voxel is one half the magnitude of $c_i$ for a coarse voxel. As discussed above, the volume of a parallelepiped for a facet $F_\alpha$ is defined as:

$$V_{i\alpha} = |c_i \cdot n_\alpha| A_\alpha.$$

Accordingly, because the surface area $A_\alpha$ of a facet does not change between coarse and fine parallelepipeds, and because the unit normal $n_\alpha$ always has a magnitude of one, the volume of a fine parallelepiped corresponding to a facet is one half the volume of the corresponding coarse parallelepiped for the facet.

Particles are moved from coarse facets $F_{\alpha C}$ to black facets $F_{\beta ICb}$ with a weighting factor of $V_{\alpha\beta}$ that corresponds to the volume of the unblocked portion of the fine parallelepiped that extends from a facet $F_\alpha$ and that lies behind a facet $F_\beta$.

Particles are moved from red facets $F_{\alpha ICr}$ to coarse facets $F_{\beta C}$ with a weighting factor of $V_{\alpha\beta}$, and from coarse facets $F_{\alpha C}$ to red facets $F_{\beta ICr}$ with a weighting factor of $V_{-\alpha\beta}$.

Particles are moved from red facets $F_{\alpha JCr}$ to black facets $F_{\beta JCb}$ with a weighting factor of $V_{\alpha\beta}$. In this stage, black-to-red advections do not occur. In addition, because the black and red facets represent consecutive time steps, black-to-black advections (or red-to-red advections) never occur. For similar reasons, particles in this stage are moved from red facets $F_{\alpha JCr}$ to fine facets $F_{\beta IF}$ or $F_{\beta F}$ with a weighting factor of $V_{\alpha\beta}$, and from fine facets $F_{\alpha IF}$ or $F_{\alpha F}$ to black facets $F_{\alpha JCb}$ with the same weighting factor.

Finally, particles are moved from fine facets $F_{\alpha IF}$ or $F_{\alpha F}$ to other fine facets $F_{\beta IF}$ or $F_{\beta F}$ with the same weighting factor, and from coarse facets $F_{\alpha C}$ to other coarse facets $F_C$ with a weighting factor of $V_{C\alpha\beta}$ that corresponds to the volume of the unblocked portion of the coarse parallelepiped that extends from a facet $F_\alpha$ and that lies behind a facet $F_\beta$.

After particles are advected between surfaces, particles are gathered from the voxels in a first gather stage (steps 1104–1110). Particles are gathered for fine facets $F_{\alpha F}$ from fine voxels using fine parallelepipeds (step 1104), and for coarse facets $F_{\alpha C}$ from coarse voxels using coarse parallelepipeds (step 1106). Particles are then gathered for black facets $F_{\alpha JRb}$ and for VR fine facets $F_{\alpha IF}$ from both coarse and fine voxels using fine parallelepipeds (step 1108). Finally, particles are gathered for red facets $F_{\alpha JRr}$ from coarse voxels using the differences between coarse parallelepipeds and fine parallelepipeds (step 1110).

Next, coarse voxels that interact with fine voxels or VR facets are exploded into a collection of fine voxels (step 1112). The states of a coarse voxel that will transmit particles to a fine voxel within a single coarse time step are exploded. For example, the appropriate states of a coarse voxel that is not intersected by a facet are exploded into eight fine voxels oriented like the microblock of FIG. 2. The appropriate states of coarse voxel that is intersected by one or more facets are exploded into a collection of complete and/or partial fine voxels corresponding to the portion of the coarse voxel that is not intersected by any facets. The particle densities $N_i(x)$ for a coarse voxel and the fine voxels resulting from the explosion thereof are equal, but the fine voxels may have fractional factors $P_f$ that differ from the fractional factor of the coarse voxel and from the fractional factors of the other fine voxels.

Thereafter, surface dynamics are performed for the fine facets $F_{\alpha IF}$ and $F_{\alpha F}$ (step 1114), and for the black facets $F_{\alpha JCb}$ (step 1116). Dynamics are performed using the procedure illustrated in FIG. 9 and discussed above.

Next, particles are moved between fine voxels (step 1118) including actual fine voxels and fine voxels resulting from the explosion of coarse voxels. Once the particles have been moved, particles are scattered from the fine facets $F_{\alpha IF}$ and $F_{\alpha F}$ to the fine voxels (step 1120).

Particles are also scattered from the black facets $F_{\alpha JCb}$ to the fine voxels (including the fine voxels that result from exploding a coarse voxel) (step 1122). Particles are scattered to a fine voxel if the voxel would have received particles at that time absent the presence of a surface. In particular, particles are scattered to a voxel $N(x)$ when the voxel is an actual fine voxel (as opposed to a fine voxel resulting from the explosion of a coarse voxel), when a voxel $N(x+c_i)$ that is one velocity unit beyond the voxel $N(x)$ is an actual fine voxel, or when the voxel $N(x+c_i)$ that is one velocity unit beyond the voxel $N(x)$ is a fine voxel resulting from the explosion of a coarse voxel.

Finally, the first fine time step is completed by performing fluid dynamics on the fine voxels (step 1124). The voxels for which fluid dynamics are performed do not include the fine voxels that result from exploding a coarse voxel (step 1112).

The procedure 1100 implements similar steps during the second fine time step. Initially, particles are moved between surfaces in a second surface-to-surface advection stage (step 1126). Particles are advected from black facets to red facets, from black facets to fine facets, from fine facets to red facets, and from fine facets to fine facets.

After particles are advected between surfaces, particles are gathered from the voxels in a second gather stage (steps 1128–1130). Particles are gathered for red facets $F_{\alpha JRr}$ from fine voxels using fine parallelepipeds (step 1128). Particles also are gathered for fine facets $F_{\alpha F}$ and $F_{\alpha IF}$ from fine voxels using fine parallelepipeds (step 1130).

Thereafter, surface dynamics are performed for the fine facets $F_{\alpha IF}$ and $F_{\alpha F}$ (step 1132), for the coarse facets $F_{\alpha C}$ (step 1134), and for the red facets $F_{\alpha JCr}$ (step 1136) as discussed above.

Next, particles are moved between voxels using fine resolution (step 1138) so that particles are moved to and from fine voxels and fine voxels representative of coarse voxels. Particles are then moved between voxels using coarse resolution (step 1140) so that particles are moved to and from coarse voxels.

Next, in a combined step, particles are scattered from the facets to the voxels while the fine voxels that represent coarse voxels (i.e., the fine voxels resulting from exploding coarse voxels) are coalesced into coarse voxels (step 1142). In this combined step, particles are scattered from coarse facets to coarse voxels using coarse parallelepipeds, from fine facets to fine voxels using fine parallelepipeds, from red facets to fine or coarse voxels using fine parallelepipeds, and from black facets to coarse voxels using the differences between coarse parallelepipeds and find parallelepipeds. Finally, fluid dynamics are performed for the fine voxels and the coarse voxels (step 1144).

E. Viscosity Reduction

The viscosity of the simulation may be modified using the over-relaxation technique described in "VISCOSITY REDUCTION IN PHYSICAL PROCESS SIMULATION", U.S. Pat. No. 5,606,517, which is incorporated by reference. Viscosity is a measure of a fluid's resistance to a shear force (i.e., a force which acts parallel to the direction of fluid flow). In an actual fluid, viscosity results from interactions between neighboring particles in the fluid that cause the velocities of the particles to gravitate toward an average value. In a lattice system, viscosity results from interactions between particles positioned in specific voxels that cause the net velocity of the particles positioned in a voxel to gravitate toward the net velocity of the particles positioned in neighboring voxels. Because each voxel in a lattice system represents a region of simulated space that is substantially larger than the physical space that would be occupied by an actual particle, the viscosity resulting from interactions between voxels is substantially greater than that resulting from molecular particle interactions in real fluids (i.e., the "averaging" resulting from each voxel interaction affects a substantially larger region of space than that resulting from each molecular particle interaction).

Viscosity in a lattice system can be reduced by increasing the density of the lattice (i.e., by decreasing the quantity of simulated space that is represented by each voxel), and also can be reduced through use of over-relaxation. Viscosity, $v$, can be expressed in terms of $\omega$, the relaxation parameter:

$$v = T(1/\omega - 1/2)$$

where T is the temperature of the fluid. Thus, for example, relative to a relaxation parameter of one ($v=T/2$), a relaxation parameter of 1.8 ($v=T/18$) will reduce the viscosity in the lattice by a factor of nine.

Use of over-relaxation effectively increases the density of the lattice. Use of over-relaxation therefore has a dramatic effect on the processing necessary to simulate a physical system with a particular resolution (or the resolution with which a particular processor can simulate a physical system). For example, a tenfold increase in the effective density of a three dimensional lattice reduces the processing required to simulate a physical system with the lattice to a particular level of resolution by a factor of almost ten thousand (i.e., ten cubed less the additional processing required to implement over-relaxation and multiplied by a tenfold decrease in the time required to simulate a fluid of a given velocity).

To change the viscosity of the simulated physical process, the system performs viscosity modification operations on the state vectors. These operations are typically performed after the fluid dynamics operations and apply a set of rules that are similar to, or the same as, the rules applied during the fluid dynamics operations. Where the same rules are applied, the rules modify the state vectors by a first amount during the fluid dynamics operations and a second amount during the viscosity modification operations, where the first amount is related to the second amount by a relaxation parameter. Because the rules used in the interaction operations conserve mass, momentum and energy, this approach ensures that these properties will be conserved during the viscosity modification operations.

In one implementation, the viscosity of the lattice system is reduced by using a relaxation parameter having a value greater than one and less than two. As the relaxation parameter approaches two, the viscosity of the simulated system approaches zero and the system becomes unstable. Viscosity, which is essentially a form of friction, tends to damp out fluctuations in the system. Thus, instability occurs when there is no viscosity because these fluctuations are allowed to spread unchecked through the system. It has been found that instability can generally be avoided by using a relaxation parameter that is less than or equal to 1.9.

F. Modeling the Skin Friction Coefficient

Figure 12:
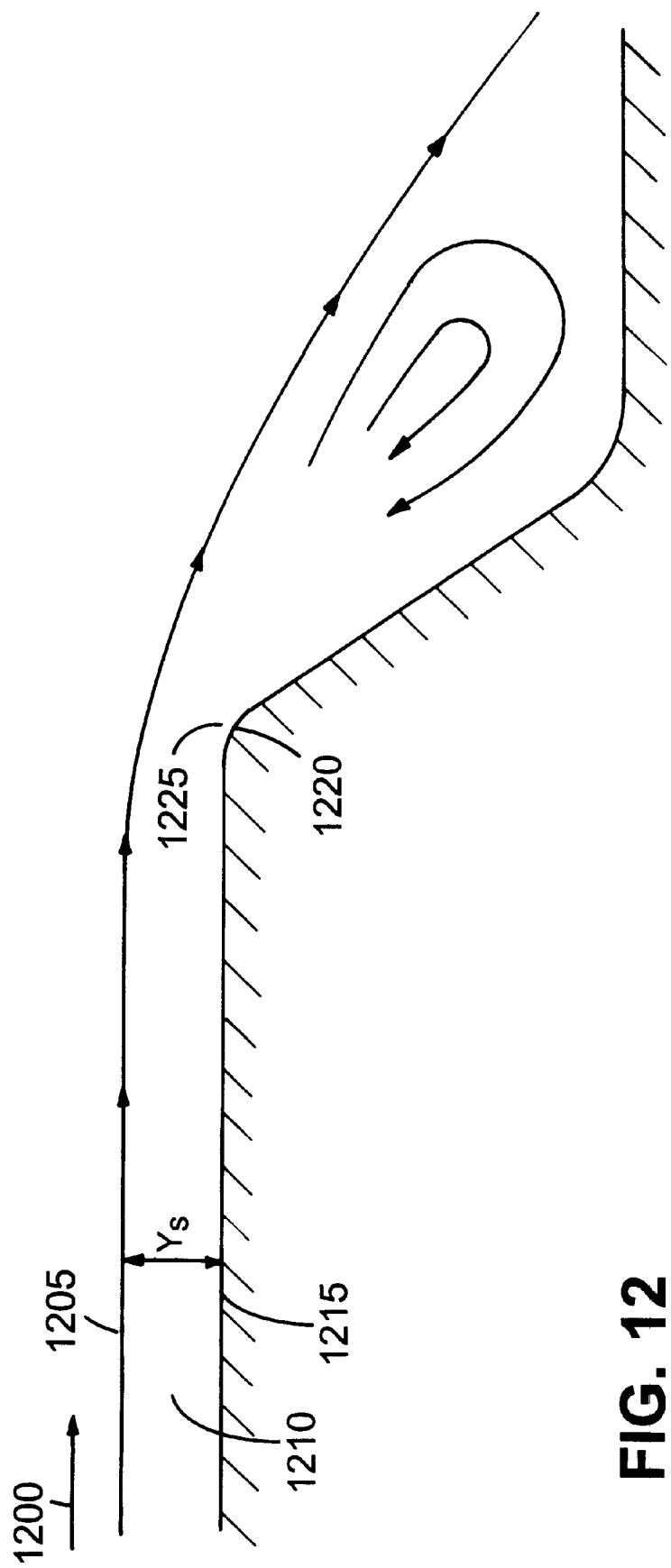
FIG. 12 illustrates a boundary layer for flow along a surface.

As noted above, shear stress at a surface may be approximated by flow within the boundary layer above the surface. Referring to FIG. 12, a skin friction coefficient $C_f$ may be used to simulate the resistance to tangential flow 1200 at the location 1205 within the boundary layer 1210, which is a distance $y_s$ above the surface 1215.

For sufficiently-large Reynolds numbers, the velocity gradient near a surface may be expressed as:

$$\frac{du}{dy} = \frac{u_\tau}{\kappa y},$$

where u is the flow rate or velocity, y is the distance above the surface, $\kappa$ is the Von Karman constant, which has a value of about 0.4, and $u_\tau$ is a friction velocity that is defined so that:

$$\tau_w = \rho u_\tau^2,$$

where $\tau_w$ is the shear stress at the wall and $\rho$ is the particle density.

The above expression for the velocity gradient is a result of two assumptions: that the only relevant length scale is y, and that the shear stress is constant near the surface. This ensures that $u_\tau$ is the only relevant velocity scale. Consequently, the shear stress $\tau$ within the boundary layer also may be expressed as:

$$\tau = \tau_w = C_f \frac{1}{2} \rho U_s^2,$$

where $C_f$ is the skin friction coefficient and $U_s$ is the instantaneous velocity at a distance $y_s$ above the surface.

Combining the two expressions for the shear stress $\tau_w$ produces:

$$\frac{U_s}{u_\tau} = \sqrt{\frac{2}{C_f}}.$$

Similarly, integrating the expression for the velocity gradient to a height $y_s$ above the surface results in the so-called logarithmic velocity profile:

$$\frac{U_s}{u_\tau} = \frac{1}{\kappa}\left[\ln\left(\frac{u_\tau y_s}{\nu}\right) + B\kappa\right],$$

where B is an empirical constant having a value of approximately 5 and $\nu$ is the viscosity.

Combining these two expressions results in:

$$C_f = \frac{2\kappa^2}{\left(\ln\left(\frac{u_\tau y_s}{\nu}\right) + B\kappa\right)^2}.$$

The terms $u_\tau$ and $y_s$ may be eliminated by matching the lattice viscosity $\nu_{lat}$ to the turbulent eddy viscosity $\nu_T$ at the height $y_s$, where the expression for $\nu_T$ in the logarithmic part of the boundary layer is:

$$\nu_T = \kappa u_\tau y_s = \nu_{lat}.$$

After eliminating $y_s$ and $u_\tau$, the friction coefficient may be expressed as:

$$C_f = \frac{2\kappa^2}{\left(\ln\left(\frac{Re}{\kappa Re_{lat}}\right) + B\kappa\right)^2},$$

where $$\nu_{lat}/\nu = Re/Re_{lat},$$

Re is the flow Reynolds number, and $Re_{lat}$ is the Reynolds number of the lattice, based on the freestream lattice velocity, the lattice viscosity, and the number of voxels along the characteristic length. For the above analysis to be valid, the location of $y_s$ must be in the logarithmic region. Moreover, to ensure that all of the momentum in the flow is simulated, it is desirable that $y_s$ also be of the order of the momentum boundary layer displacement thickness, which implies a requirement on the resolution in the boundary layer. In practice, excellent results are obtained for simulations where the resolution is much coarser than the appropriate momentum boundary layer thickness.

The thickness of the region in which flow rates increase according to a logarithmic profile goes to zero at a separation point 1220 at which the flow separates from the surface. As a result, $y_s$ should approach zero at the separation point. However, the opposite occurs for the friction coefficient expression provided above, which indicates that the expression is inaccurate at the separation point.

An adverse pressure gradient in which the pressure increases in the direction of flow (dp/dx>0) occurs prior to the separation point 1220. As previously noted, the velocity on the surface equals zero. At the separation point, the adverse pressure gradient results in a change in the sign of the velocity gradient relative to the normal of the surface. In physical terms, this means that there is a point 1225 above the surface at which flow on either side of this point is going in opposite directions so that the velocity at that point equals zero ($u_\tau=0$). Since the lattice viscosity $v_{lat}$ has a constant value, the expression $$v_\tau = \kappa u_\tau y_s = v_{lat}$$

implies that $y_s$ approaches infinity as $u_\tau$ approaches zero.

This problem may be resolved by introducing another length scale that can be used to ensure that $y_s$ is within the logarithmic region. The presence of an adverse pressure gradient allows the definition of another length scale as:

$$\frac{1}{y_p} = \frac{1}{\rho u_\tau^2}\left|\frac{dp}{dx}\right|$$

with the previous length defined from viscosity matching being redefined as $y_v$:

$$y_v = \frac{v_{lat}}{\kappa u_\tau}.$$

As $dp/dx$ increases in magnitude, $y_p$ decreases and eventually reaches a point where $y_p < y_v$. The logarithmic region is valid only for $y < y_p$. Therefore, a new $y_s$ may be defined such that $y_s$ approximates $y_v$ when $y_v < y_p$ and $y_p$ when $y_p < y_v$:

$$\frac{1}{y_s} = \frac{1}{y_v} + \frac{1}{y_p}$$

or $$y_s = y_v \cdot \frac{1}{1 + y_v/y_p} = y_v \cdot \frac{1}{1 + f(dp/dx)}$$

which is then used in the expression for $C_f$. If the pressure gradient is favorable ($dp/dx<0$), then the additional term is ignored and $y_s$ equals $y_v$.

To ensure that the viscosity is consistent with the new $y_s$, the local $v_{lat}$ in the fluid may be adjusted so that:

$$v_\tau = v'_{lat} = v_{lat} \cdot \frac{1}{1 + y_v/y_p}.$$

In practice, acceptable results have been produced without this adjustment.

Consequently, the friction coefficient may be expressed as:

$$C_f = \frac{2\kappa^2}{\left(\ln\left(\frac{Re}{\kappa Re_{lat}}\left(\frac{1}{1 + \frac{v_{lat}\frac{dp}{dx}}{\kappa\rho\left(\frac{1}{2}C_{f,0}U_s^2\right)^{\frac{3}{2}}}}\right)\right) + B\kappa\right)^2},$$

where $C_{f,0}$ is the value of $C_f$ when $dp/dx$ equals zero, or:

$$C_{f,0} = \frac{2\kappa^2}{\left(\ln\left(\frac{Re}{\kappa Re_{lat}}\right) + B\kappa\right)^2}.$$

For ease of processing, the values of $C_f$ may be clamped so that $C_{f,min}$ equals $C_{f,0}$ and $C_{f,max}$ equals the value of $C_f$ when the logarithmic term equals zero ($2/B^2$, which is approximately 0.08).

Derivation of this coefficient is also described by Anagnost et al. in "DIGITAL PHYSICS Analysis of the Morel Body in Ground Proximity", *SAE Technical Paper Series*, no. 970139, presented at the SAE International Conference and Exposition, Detroit, Mich., Feb. 24–27, 1997, which is incorporated by reference. This paper also describes a simulation of flow around a Morel body using the techniques described above.

G. Generating the Skin Friction Coefficient

Figure 13:
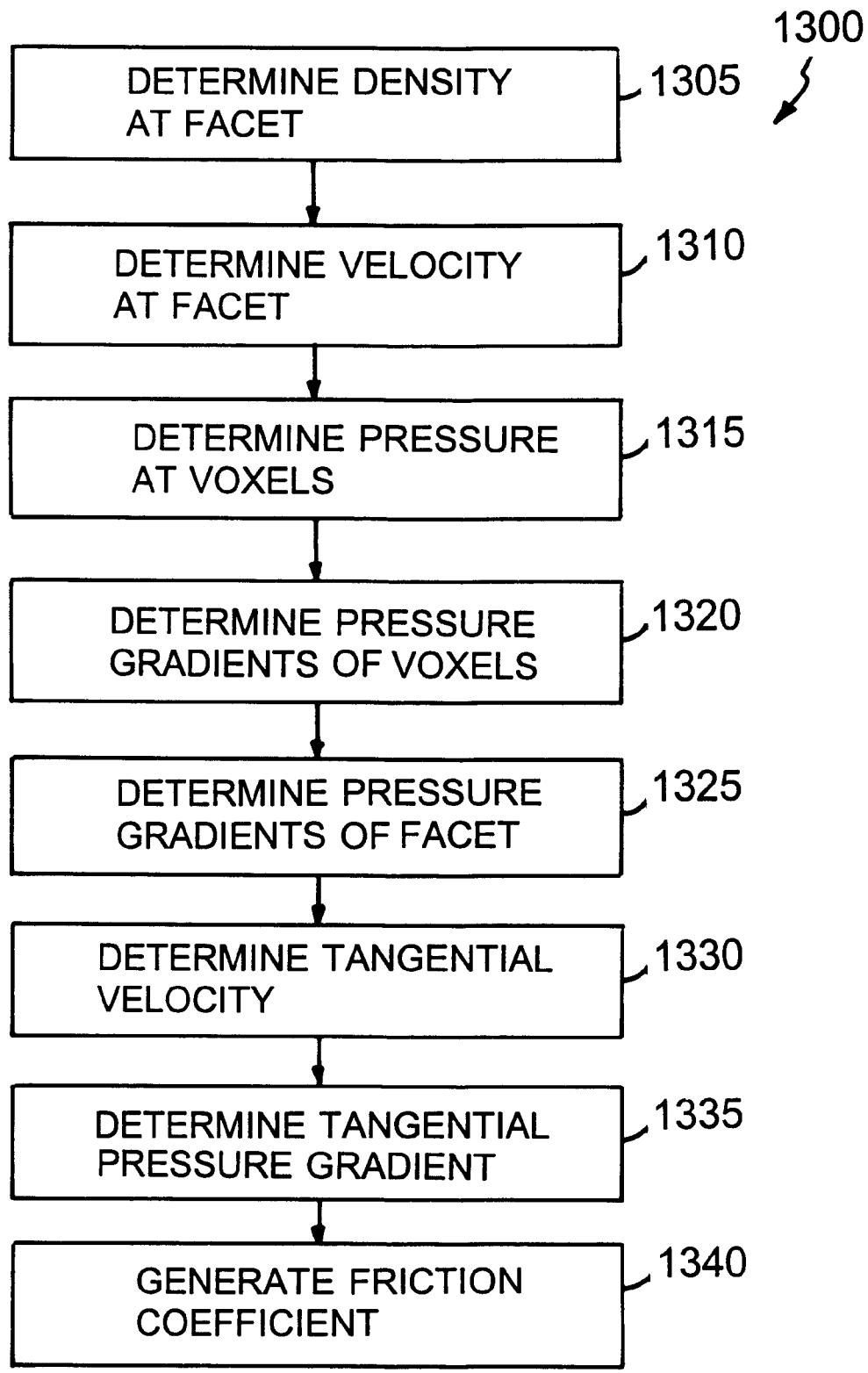
FIG. 13 is a flow chart of a procedure for generating a friction coefficient.

Referring to FIG. 13, the skin friction coefficient may be determined for each time increment according to a procedure 1300. According to the expression discussed above, the friction coefficient $C_f^\alpha$ at a facet varies based on the density at the facet ($\rho^\alpha$), the velocity at the facet ($U_s^\alpha$), and the pressure gradient ($dp^\alpha/dx$) at the facet in the direction of the velocity at the facet. As such, prior to determining the skin friction coefficient for a facet, the density at the facet is determined (step 1305). The density at the facet ($\rho^{\alpha m}$) may be measured from the distribution at the facet as:

$$\rho^{\alpha m} = \sum_i N_i^\alpha.$$

To reduce effects of high-frequency fluctuations, $\rho^\alpha(t)$, the density used in generating the friction coefficient for a time step t, is determined as:

$$\rho^\alpha(t)=(1-w_r)\rho^\alpha(t-1)+w_r\rho^{\alpha m}(t),$$

where $w_r$ is an under-relaxation factor having a value between 0 and 1. Generally, the density at the facet is determined as part of performing facet surface dynamics (step 112 of FIG. 1).

The velocity at the facet is determined in a similar manner (step 1310). First, the velocity at the facet ($U_s^{\alpha m}$) is measured as:

$$U_s^{\alpha m} = \frac{\sum_i c_i N_i^\alpha}{\rho^{\alpha m}}.$$

The velocity used in generating the friction coefficient for the time step t then is determined as:

$$U^\alpha(t)=(1-w_r)U^\alpha(t-1)+w_r U^{\alpha m}(t).$$

Next, the pressure gradient at the facet is derived from the pressure gradient in the fluid adjacent to the facet. In particular, the pressure gradient at the facet is determined as the pressure gradient in voxels that affect the facet. Initially, p, the pressure, is determined for each voxel x (step 1315) as:

$$p^{xm} = \rho^{xm}T^{xm},$$

where $T^x$, $E^x$, $U^x$ and $\rho^x$ are, respectively, the temperature, energy, velocity, and density of the voxel x, and are determined as:

$$T^x = \frac{E^x - \frac{1}{2}(\rho^x(U^x))^2}{2\rho^x},$$

$$E^x = \frac{1}{2}\sum_i N_i^x c_i^x,$$

$$U_x = \frac{\sum_i c_i N_i^x}{\rho^x},$$

and $$\rho^x = \sum_i N_i^x.$$

The pressure used in generating the friction coefficient for the time step t then is determined as:

$$p^x(t)=(1-w_r)p^x(t-1)+w_t p^{xm}(t).$$

Next, the pressure gradient $\nabla p$ is determined for each voxel (step 1320). For a voxel at a location (x, y, z) that is unaffected by a surface or by a transition between voxels of different sizes, the pressure gradient may be determined as:

$$\nabla p_{x,y,z} = \frac{p_{x+1,y,z} - p_{x-1,y,z}}{2}c_x + \frac{p_{x,y+1,z} - p_{x,y-1,z}}{2}c_y + \frac{p_{x,y,z+1} - p_{x,y,z-1}}{2}c_z.$$

For a voxel which has no neighbor in a particular direction (because of its proximity to a surface), or whose neighbor in a particular direction is of a different voxel size, the pressure gradient is determined as:

$$\nabla p_{x,y,z} = \frac{e_{x+1,y,z}(p_{x+1,y,z} - p_{x,y,z}) + e_{x-1,y,z}(p_{x,y,z} - p_{x-1,y,z})}{d_{x+1,y,z} + d_{x-1,y,z}}C_x +$$

$$\frac{e_{x,y+1,z}(p_{x,y+1,z} - p_{x,y,z}) + e_{x,y-1,z}(p_{x,y,z} - p_{x,y-1,z})}{d_{x,y+1,z} + d_{x,y-1,z}}C_y +$$

$$\frac{e_{x,y,z+1}(p_{x,y,z+1} - p_{x,y,z}) + e_{x,y,z-1}(p_{x,y,z} - p_{x,y,z-1})}{d_{x,y,z+1} + d_{x,y,z-1}}C_z,$$

where $e_{x',y',z'}$ is 1 if a voxel exists at x',y',z' and is 0 otherwise, and $d_{x',y',z'}$ is the distance from the center of the voxel x',y',z' to the voxel x,y,z (this distance is 1 if x',y',z' is the same size as x,y,z, 1.5 if larger by a factor of 2, or 0.75 if smaller by a factor of 2).

The pressure gradient $\nabla p^\alpha$ at a facet is then determined as a weighted average of the pressure gradients of voxels affected by the facet (step 1325):

$$\nabla p^\alpha = \frac{1}{16}\sum_i \sum_x \frac{V_i^\alpha(x)}{V_i^\alpha} \nabla p^x.$$

The tangential velocity $U_{t\alpha}$ is then determined by subtracting the normal component of the facet velocity from the facet velocity (step 1330):

$$U_t^\alpha = U - (U \cdot n_\alpha)n_\alpha.$$

The pressure gradient $\nabla p_t^\alpha$ in the tangential direction, is determined (step 1335):

$$\nabla p_t^\alpha = \nabla p^\alpha \cdot U_t^\alpha.$$

Finally, the friction coefficient is generated (step 1340) using the pressure gradient $\nabla p^\alpha_t$ in the expression provided above for the friction coefficient.

H. Dynamic Rates

As discussed above, the rate, r, represents the relationship between forward ($R_f$) and backward ($R_f$) collision rates. The rate depends on local temperature and may be treated as a constant for a particular voxel and time increment.

In general, the rate, in combination with flow properties such as density, temperature and velocity, controls the particle distributions among different energy levels. As with the collision operator, achieving a desirable equilibrium distribution requires proper implementation of the rate and techniques for adjusting the rate. The rate determines the ratio of equilibrium particle distributions between different energy levels, which is directly responsible for the resulting macroscopic properties of a simulated fluid. In addition, the way in which the rate is updated in time may affect the stability of the system.

For an arbitrary rate value, the resulting lattice gas transport equations may contain lattice artifacts and may not coincide with realistic hydrodynamic equations. Specifically, the resulting advection terms in the momentum and energy equations may contain a galilean invariance term, g, that does not equal one, so that the so-called galilean invariance condition (a feature of any realistic fluid) is not satisfied. By choosing a proper functional form for the rate, r, the variance term can be made to equal one, resulting in a correct fluid momentum equation to all orders relevant to hydrodynamics.

Theoretically, for a four-dimensional, three-speed lattice, such as is described above, g is given by:

$$g = \frac{2\rho}{3}\frac{H}{U_\rho^2}.$$

At each lattice site, $$\rho = d_0 n_0 + 24(n_1 + n_2)$$

is the total particle number; and $$U_\rho = 2\rho T = 24(n_1 + 2n_2)$$

is the total internal (thermal) energy. H is defined as $$H \equiv 24(n_1 + 4n_2).$$

T is the fluid dynamic temperature. The quantities $n_0$, $n_1$, and $n_2$ are the zero-flow equilibrium particle state populations at energy levels zero, one and two, respectively. Changing the rate does not change the values of $\rho$ and $U_\rho$ due to the conservation laws. However, the value of H, which does not correspond to any conservation laws, can be changed by varying the rate, which means that the value of g can be changed. By designating the rate as a function of local conserved quantities, g can have a value of 1. In fact, the zero-flow equilibrium state populations, $n_0$, $n_1$, and $n_2$, may be determined uniquely as functions of $\rho$, T and r. Using the explicit expression for these zero-flow equilibrium distributions as functions of $\rho$, T and r, and solving for g equal to 1 results in:

$$r = \frac{d_1^2}{4d_2 d_0}\frac{(3T-1)(1-3T(1-T))}{T(2-3T)^2},$$

where $d_0$, $d_1$ and $d_2$ correspond, respectively, to the number of energy level zero, energy level one and energy level two states. When there are six energy level zero states, and 24 of each of the energy level one and two states, this simplifies to:

$$r = \frac{(3T-1)(1-3T(1-T))}{T(2-3T)^2}.$$

Accordingly, galilean invariance may be recovered and realistic fluid flows may be simulated if the rate is computed according to this formulation.

Because temperature T is invariant under collisions, the rate expressed above is a fixed quantity at a given time step and lattice site. The rate at each site and each time step may be computed using spatially averaged local particle distributions to approximate the temperature T, which is a macroscopic quantity. In particular, the temperature T may be expressed as:

$$\text{temperature} = T = \frac{U - 0.5\rho\bar{u}^2}{2\rho}$$

where $$\text{density} = \rho = \sum_{ji} N_{ji},$$

$$\text{momentum} = \rho\bar{u} = \sum_{ji} N_{ji}\bar{c}_{ji},$$

$$\text{energy} = U = \sum N_{ji}e_j, \text{ and}$$

$$\text{velocity} = \bar{u} = \frac{\rho\bar{u}}{\rho}.$$

The $\bar{u}^2$ term may be ignored when calculating the temperature value for small Mach number values (e.g., subsonic flow). In view of this, the temperature may be approximated as:

$$T \approx \frac{U}{2\rho}$$

so that the rate at each lattice site is determined from the energy and density only.

Thus, the rate at each lattice site is defined as a function of the conserved quantities, such as density ρ and energy U, which may be averaged within each microblock. At different times, the particle state populations and conserved quantities at a lattice site change, which changes the rate. Since the hydrodynamic properties evolve on a longer time scale relative to the lattice time scale, time averaging may be performed to update the rate:

$$r(x,t+1) = \omega_r r^{ex}(x,t+1) + (1+\omega_r)r(x,t),$$

which filters out high frequency fluctuations. In this expression, $r^{ex}(x,t+1)$ is evaluated using the approximated temperature. The time step, t+1, is defined as the time right after advection but before collisions. Compared to the over-relaxation parameter, $\omega_c$, used for viscosity reduction, the parameter $\omega_r$ acts as an under-relaxation parameter and has a value chosen to be in the range between 0 and 1 instead of between 1 and 2. If $\omega_r$ equals one, the rate, r, is updated completely at every time increment.

In general, the system will remain stable when:

$$\omega_r = \frac{v}{T}\epsilon_r = \left(\frac{1}{w_c} - \frac{1}{2}\right)\epsilon_r$$

where $\omega_c$ is in the range $1.0 \leq \omega_c \leq 1.8$, v is the viscosity and $\epsilon_r$ is an empirically determined constant in the range from 0 to 1. This constant is a safety factor that assures stability and may be set equal to 1.0.

The update procedure described above is sufficient if there is no net flow of the fluid.

To account for fluid flow, rates for different voxels are, in effect, advected between voxels. This may be expressed as:

$$r(x, t+1) = (1-\omega_r)r(x-u, t) + \omega_r r^{ex}(x-u, t+1)$$

$$= (1-\omega_r)r(x, t) + \omega_r r^{ex} - (1-\omega_r)\bar{u}\cdot\nabla r(x,t) - \omega_r\bar{u}\cdot\nabla r^{ex}$$

This expression advects the previous rates and the exact rates. Typically, $\omega_r$ is small compared to unity. If the gradient is also small, the advection of the exact rate may be a small correction to the advection of the previous rate. In light of this, the expression may be simplified to:

$$r(x,t+1) = (1-\omega_r)r(x,t) + \omega_r r^{ex} - \bar{u}\nabla r(x,t)$$

so that only the previous rate information is advected.

The gradient operator acting on the previous rate may be discretized using, for example, the upwind differencing technique. For the x-component of the velocity, the upwind differencing technique may be expressed as:

$$u_x\frac{\delta r}{\delta x} = \begin{cases} \frac{u_x}{h}(r(x) - r(x-h)); & u_x > 0 \\ \frac{u_x}{h}(r(x-h) - r(x)); & u_x \leq 0 \end{cases}$$

Analogous expressions exist for the y and z components. When the rate is generated at the microblock level, the expansion length h equals two cells.

I. Non-Collision-Based Fluid Dynamics

In another approach to fluid dynamics, the integer particle distribution of voxels within a fluid simulation may be computed directly. In contrast to the collision-based approach described above, the direct-computation technique calculates a distribution directly using floating point numbers according to analytic definitions for equilibrium and over-relaxation. The technique then integerizes the distribution in a way that guarantees conservation of mass, momentum and energy while ensuring that all state populations are integer values within permitted ranges. The accuracy of the technique is a function of the range allowed for individual states, and excellent results have been obtained using a sixteen-bit representation.

The 16-bit representation uses a simplified representation of the lattice that includes 34 three-dimensional states instead of the 54 four-dimensional states described above. Five of the 54 states are eliminated by combining the six rest states into a single rest state (0,0,0). Fifteen states are eliminated to reduce the number of states from 49 to 34 by collapsing pairs of states that have "momentum" in the w-direction into doubly populated states referred to as dual states. Thus, for example, the energy level one states (0,0,-1,-1) and (0,0,-1,1) are combined into a single energy level one dual state (0,0,-1). Similarly, the energy level two states (0,0,0,–2) and (0,0,0,2) are combined into a single energy level two dual state (0,0,0) that is to be distinguished from the rest state (0,0,0). This 34-state representation, in effect, eliminates w-momentum from the system.

The direct-computation technique offers a number of advantages over the collision-based approach described above. For example, direct computation of the distribution permits sophisticated refinements to be incorporated into the distribution. These refinements may be computationally difficult to achieve with the collision-based approach. For instance, as discussed in detail below, the technique may alter the thermal conductivity of the fluid, without changing viscosity, by altering the definition of over-relaxation in a straightforward way.

When a distribution is computed directly, either the expanded or exponential forms of the equilibrium may be implemented. The exponential form is guaranteed to be stable when the rate is fixed and the amount of over-relaxation is conservative. However, the exponential form includes hydrodynamic errors that are fourth order in velocity. By contrast, the expanded form has no fourth order velocity errors, is more efficient to evaluate than the exponential form, and has been demonstrated empirically to be stable over a wide range of operating conditions. However, in general, the exponential form is stable over a wider range of conditions than is the expanded form.

The accuracy of a directly computed distribution is both high and predictable. The accuracy of a distribution computed using the collision-based approach depends on the number of collide rules and the local fluid conditions (e.g., shear stress) unless the number of rules is sufficiently large. For this reason, it is difficult to predict what accuracy is achieved by the collision-based approach. Moreover, in the collision-based approach, accuracy must be traded for speed by limiting the number of rules.

Figure 14:
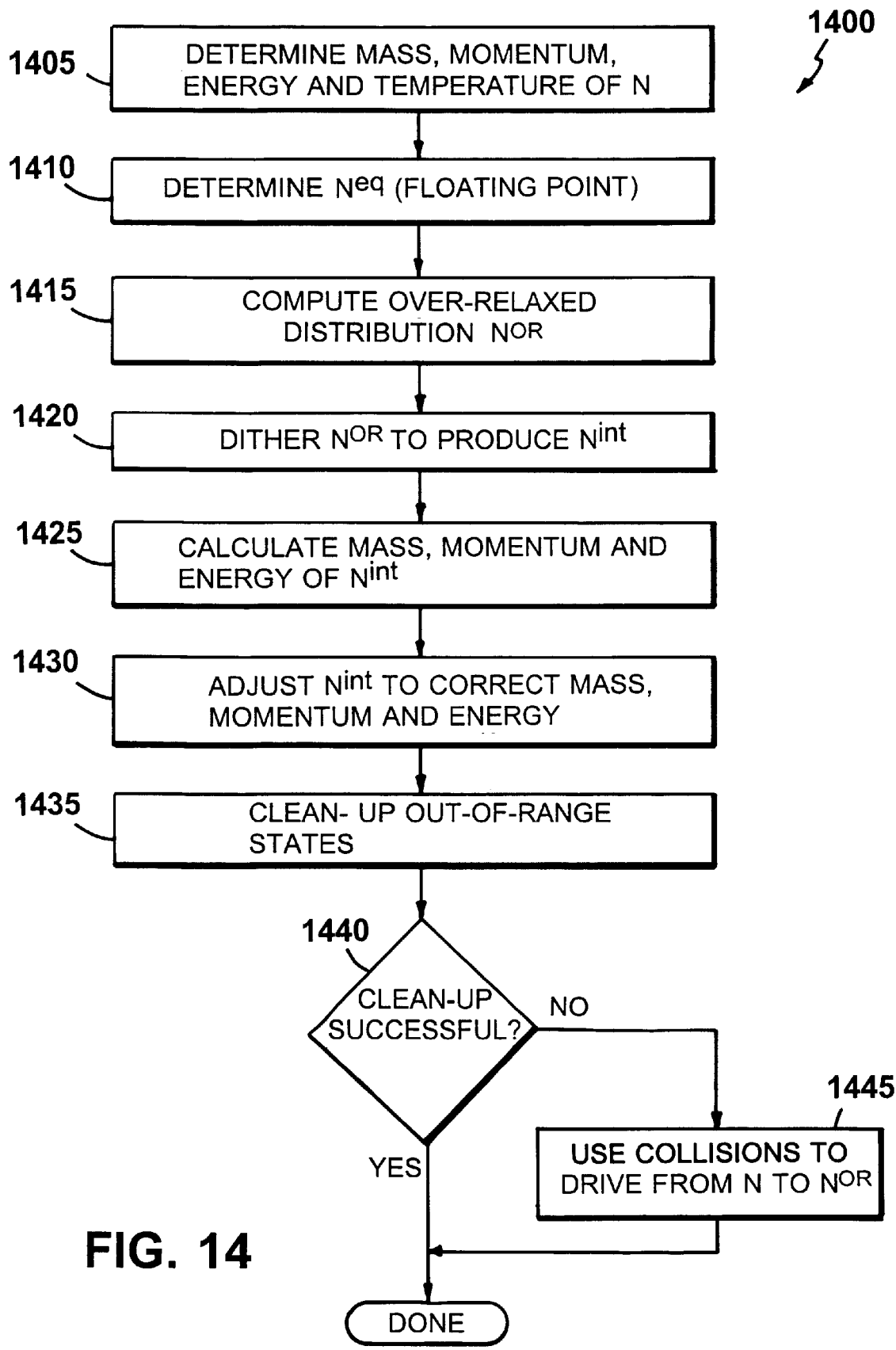
FIG. 14 is a flow chart of a procedure for performing fluid dynamics through direct computation of particle distributions.

The direct-computation technique may be implemented according to the procedure 1400 illustrated in FIG. 14. For purposes of this discussion, it is assumed that each state is represented by a 16-bit integer (i.e., a value from 0 to 65,535). As a first step, the mass, momentum, energy and temperature of N, the initial integer distribution, are determined (step 1405):

$$\text{density} = \rho = \sum_{ji} N_{ji},$$

$$\text{momentum} = \rho\bar{u} = \sum_{ji} N_{ji}\bar{c}_{ji},$$

$$\text{energy} = U = \sum N_{ji}e_j,$$

$$\text{velocity} = \bar{u} = \frac{\rho\bar{u}}{\rho}, \text{ and}$$

$$\text{temperature} = T = \frac{U - 0.5\rho\bar{u}^2}{2\rho}.$$

Next, the floating point equilibrium distribution, $N^{eq}$, is computed (step 1410). The equilibrium distribution is computed using a combination of an expanded form for the distribution and an exponential form for the distribution. At sufficiently high velocities, a purely expanded equilibrium form will yield negative states, which tend to compromise stability. While such high velocities are clearly outside the recommended operating range of the system (for a variety of reasons other than just stability), such conditions can arise periodically in real simulations. To ensure that all states are non-negative, the equilibrium distribution is generated as a linear function of the expanded form and the exponential form:

$$N^{eq}_i = (1-a)N^{xpd}_i + aN^{exp}_i$$

where $N^{xpd}$ is the expanded form equilibrium, $N^{exp}$ is the exponential form equilibrium, and a is defined as the maximum of $a_i$ for those states where $N^{xpd}_i$ is negative:

$$a_i = \frac{-N^{xpd}_i}{N^{exp}_i - N^{xpd}_i} \text{ if } N^{xpd}_i < 0, \text{ otherwise } 0.$$

The exponential equilibrium is defined as:

$$N^{exp}_{ji} = N^{iso}_j \exp\left(\frac{\bar{c}_{ji} \cdot \bar{u}}{T} - \frac{\bar{u}^2}{2T}\right).$$

The expanded equilibrium is defined below.

If both the expanded form and the exponential form have correct mass, momentum and energy, a linear combination of the two will also have correct mass, momentum and energy. Of course, for the exponential form shown above, the velocity, temperature and density of the calculated distribution are not identical to the velocity, temperature and density entered into the calculation. Hence, it is necessary to iterate in order to discover a u*, T* and ρ* that yield a distribution with the desired u, T, and ρ to within an acceptable error. Evidence to date indicates that, given the limited use of the exponential form (i.e., a tends to be extremely small if not zero), it is unnecessary to iterate. While this implies that the equilibrium distribution lacks correct mass, momentum and energy, the error tends to be small because a tends to be small, and a later step in the algorithm that corrects mass, momentum and energy errors due to integerization seems also to handle any mass, momentum and energy error due to the exponential form quite well. While improving stability, the use of a combined representation is expected to have a minor impact on overall system performance, because it is expected that the exponential form will be calculated rarely.

The expanded distribution may be expressed as:

$$N^{xpd}_{ji} = N^{iso}_j\left(\frac{1 + (\bar{c}_{ji} \cdot \bar{u})}{T} + b(\bar{c}_{ji} \cdot \bar{u})^2 - \left(1 - \frac{a^3}{3}\right)(\alpha + j\beta) - q - \Gamma(\bar{c}_{ji} \cdot \bar{u}) + \frac{(\bar{c}_{ji} \cdot \bar{u})^3}{6T^3} - \frac{(\bar{c}_{ji} \cdot \bar{u})(\alpha + j\beta)}{T}\right),$$

where $\Gamma$, $\alpha$, and $\beta$ are temporary variables that are proportional to velocity squared:

$$\Gamma = \frac{\bar{u}^2(1-g)}{4T^2},$$

$$\alpha = \frac{\bar{u}^2}{2T(2(g-1)+g)}, \text{ and}$$

$$\beta = \frac{3\bar{u}^2(g-1)}{4T^2(2(g-1)+g)}.$$

$N_j^{iso}$ are the isotropic populations for energy level j, with a velocity of zero:

$$N_0^{iso} = 6ry,$$

$$N_1^{iso} = yz, \text{ and}$$

$$N_2^{iso} = yz^2,$$

The rate, r, may be expressed as:

$$r = \frac{(3T_0 - 1)(3T_0^2 - 3T_0 + 1)}{T_0(2 - 3T_0)^2},$$

where $T_0$ is the initial temperature. Since the rate, r, is based on the initial temperature, the galilean invariance term, g, will have a value other than unity, and may be expressed as:

$$g = \frac{2\rho H}{3U_p^2}.$$

The remaining variables used in the generation of $N_{ji}^{xpd}$ (z, y, H, $U_p$, a, b and q) may be expressed as:

$$z = \frac{\sqrt{1 - 2t)^2 + 4rT(1 - T)} - (1 - 2T)}{4(1 - T)}.$$

$$y = \frac{2\rho(1 - T)}{12r + 24z},$$

$$H = 24N_1^{iso} + 96N_2^{iso},$$

$$U_p = 24N_1^{iso} + 48N_2^{iso},$$

$$a = 3g - 2,$$

$$b = \frac{3 - a^3 + a^2}{6T^2}, \text{ and}$$

$$q = \frac{a^2 \bar{u}^2}{6T}.$$

The equilibrium distribution is expressed using the expanded form, and incorporating an explicit rate r. Since the rate is based on the initial temperature $T_0$, g will have a value other than 1. The essential stability properties of the system are tied to the rate dynamics. As such, and as with the collision-based approach described above, the system may become unstable when the rate is derived from the instantaneous temperature. Stability can be maintained by gradually evolving the rate, such as by advecting rates as described above.

In general, there are two effects of g varying from unity: an advection error and a pressure anomaly. In a shear decay experiment, the advection error is almost undetectable, but the pressure anomaly becomes observable at high velocities. For this reason, a correction factor that will effectively eliminate the pressure anomaly as long as g is reasonably close to unity has been incorporated into the formulation provided above. By direct algebra, one can show that the correction will not alter the g effect for advection, while the pressure anomaly now becomes proportional to $\bar{u}^2(g-1)^2$, as opposed to $\bar{u}^2(g-1)$ without the correction. This result has been confirmed by direct numerical testing.

Next, an over-relaxed distribution $N^{or}$ that achieves both desired viscosity and thermal conductivity is computed as (step 1415):

$$N_{ji}^{OR} = N_{ji} - \omega_c(N_{ji} - N_{ji}^{eq}) - \frac{\omega_d}{24j} \sum_{i \in j} (\bar{c}_{ji} \cdot \bar{c}_{ji})(N_{\hat{j}i} - N_{\hat{j}i}^{eq}),$$

where $\omega_c$ is a relaxation parameter related to viscosity, $\nu$, and $\omega_d$ is a relaxation parameter related to thermal conductivity, $\kappa$. The relationship between the parameters may be expressed as:

$$\frac{\nu}{T} = \frac{1}{\omega_c} - \frac{1}{2},$$

$$\frac{\kappa}{T} = \frac{D+2}{D}\left(\frac{1}{\lambda} - \frac{1}{2}\right), \text{ and}$$

$$\lambda = \omega_c + \frac{\omega_d}{2}.$$

This formulation of over-relaxation allows control of both viscosity $\nu$ and thermal conductivity $\kappa$ separately. Previously, $\omega_c$ has provided interdependent viscosity and thermal conductivity control. The addition of $\omega_d$ provides separate control of thermal conductivity. The first two terms in the calculation of $N^{or}$ represent a traditional definition of over-relaxation relative to viscosity. The third term is a new term that affects thermal conductivity exclusively.

Experiments indicate that setting $\omega_d$ to zero (the traditional definition of over-relaxation) leads to difficulties when $\omega_c$ approaches 2 and/or velocity shears are high. The new approach appears to yield a much lower and more accurate thermal conductivity than the collision-based process under these conditions. The lower thermal conductivity implies that the fluid is less able to dissipate a temperature shear, thus leaving a steeper temperature profile, a wider temperature range, and a higher noise level. In a number of cases, an extremely low thermal conductivity appears to heavily influence the overall hydrodynamics. By limiting $\lambda$ to a maximum of 1.85 (by choosing $\omega_d$ appropriately), the new approach fairly accurately replicates the thermal behavior of the collision-based approach.

Next, an integer distribution $N^{int}$ is created by dithering $N^{or}$ (step 1420):

$$N_i^{int} = \text{dither } (N_i^{or}).$$

Dithering is a probabilistic rounding function. Traditional, non-probabilistic rounding also may work. The importance of dithering decreases as the number of bits used to represent integer states increases. Values for $N_i^{int}$ need not be in the allowable range of values (e.g., from 0 to 65,535).

The mass, momentum and energy of $N^{int}$ are calculated using the expressions discussed above (step 1425). $N^{int}$ then is adjusted so that the mass, momentum and energy of $N^{int}$ is identical to the mass, momentum and energy of N (step 1430). The mass, momentum and energy discrepancy between N and $N^{int}$ prior to adjustment is always fairly small because $N^{OR}$ has the same mass, momentum and energy as N to floating-point accuracy. In practice, the error in any moment (mass, x-momentum, y-momentum, z-momentum, or energy) is usually less than five out of a total particle population of nearly 350,000 (the typical operating density for a 16-bit system). One exception to the observation that the mass, momentum, and energy error is very small occurs when the exponential form without iteration is incorporated into the equilibrium distribution. Empirical evidence indicates that this is not problematic.

A number of techniques may be used to restore proper mass, momentum and energy to $N^{int}$. The basic constraints on the technique used are that it should be efficient, should strive to minimize the deviation from the initial distribution $N^{int}$, and should be free of any biases that may manifest themselves as macroscopic artifacts. The deviation can be measured using an H function:

$$H = \sum_i \frac{(\overline{N}_i^{int} - N_i^{int})^2}{N_i^{int}}$$

where $\overline{N}_i^{int}$ is the final state of $N^{int}$ after mass, momentum and energy restoration is complete. An implication of this definition of H is that the mass, momentum and energy restoration process should focus on states that are highly populated, and should leave lightly populated states untouched.

Figure 15:
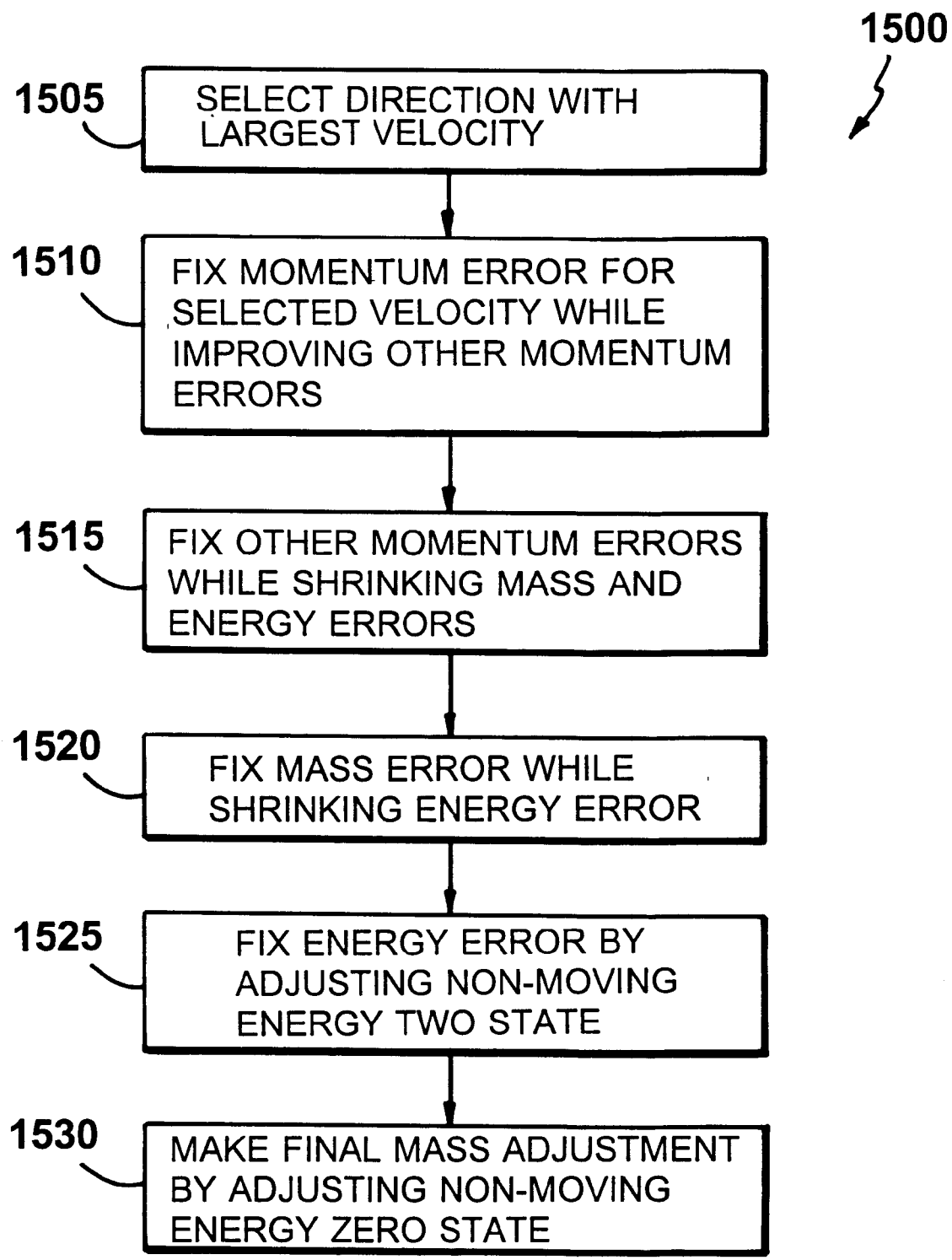
FIG. 15 is a flow chart of a procedure for adjusting the mass, momentum and energy of a particle distribution.

A technique that satisfies these constraints is illustrated by the procedure 1500 of FIG. 15. Initially, the direction (+X, –X, +Y, –Y, +Z, or –Z) having the largest velocity component is selected (step 1505). The scope of the adjustment then is restricted to the "hemisphere" of states defined by the chosen cardinal direction. For instance, if the x-component of velocity is largest and it is positive, the +X direction is selected, and the adjustment is restricted to states having a non-negative x-component of velocity. Limiting the scope of the adjustment to states corresponding to the largest velocity tends to limit the scope to states which have a reasonably high population.

For the discussion of subsequent steps of the procedure, it is assumed that the +X hemisphere has been selected. In addition, the following mass, momentum and energy discrepancies, or errors, are assumed:

$\rho^{err} = -4$ $U^{err} = -8$ $p_x^{err} = -9$ $p_y^{err} = -5$ $p_z^{err} = 3$ The mass error of –4 implies that four particles must be subtracted from $N^{int}$. The other factors indicate that the energy must be reduced by eight, the x-momentum must be reduced by nine, the y-momentum must be reduced by five, and the z-momentum must be increased by three.

First, the error in the momentum for the selected axis (i.e., the x-momentum) is fixed while simultaneously improving the error in the other momentum components (i.e., the y-momentum and z-momentum components) (step 1510). When the +X hemisphere has been chosen, this is accomplished by adding or subtracting particles to or from states with positive x-velocity. This may exacerbate the mass and/or energy error. In some cases, both energy level one and energy level two states can be altered. When states of both energy levels are altered, the total correction may be apportioned between energy level one and energy level two states based on the relationship between the energy error and the mass error (or an approximation thereof):

$$\frac{\Delta 2}{\Delta 1} = K \left| \frac{U^{err} - \rho^{err}}{\rho^{err}} \right|$$

where $\Delta 1$ and $\Delta 2$ are the changes in the selected momentum achieved through changes to, respectively, energy level one and energy level two states, and K is a controllable constant. This formulation attempts to eliminate any bias between energy levels. If the energy error is equal to the mass error, only energy level one states are altered. As the energy error becomes large with respect to the mass error, primarily energy level two states are altered.

As an example, the x-momentum error may be corrected by subtracting three particles from state (1,1,–1), two particles from state (1,1,0), one particle from state (2,0,0), and two particles from state (1,0,0). In general, this step corrects only the momentum for the selected axis. However, in this case, the step restores x-momentum, y-momentum, and z-momentum to their proper values. The mass and energy errors both become 4.

Next, the errors in the unselected momentums are fixed while simultaneously shrinking the mass and energy errors (step 1515). This step leaves the selected axis momentum unmodified, and uses only energy level one states because it modifies only states with zero momentum in the selected axis. To fix the smaller of the errors, while also shrinking the other, a state pair with non-zero velocities in both unselected momentums is modified. Then, with the smaller error fixed, the other error is fixed using a state pair with a non-zero velocity in only one of the unselected directions.

In the example described above, the y-momentum and z-momentum errors were fixed during correction of the x-momentum. As an illustration of step 1515, another example with a y-momentum error of 12, a z-momentum error of 16, a mass error of 8, and an energy error of 10 is considered. In this example, two particles are subtracted from state (0,–1,–1) and 10 particles are added to state (0,1,1). This drives the y-momentum error to 0, the z-momentum error to 4, the mass error to 0, and the energy error to 2. Next, two particles are subtracted from state (0,0,–1) and two particles are added to state (0,0,1) to drive the z-momentum error to zero.

Next, the mass error is fixed by adding or subtracting particles from randomly selected pairs of parity states that each have zero x-momentum, while simultaneously shrinking the energy error (step 1520). In the first example (mass error of 4 and the energy error of 4), two particles may be added, for example, to state (0,1,0), while two particles are added to state (0,–1,0). This restores both mass and energy to their proper values without changing momentum. If the energy error had been larger than the mass error, some of the particles would have been added to a pair of states having energy level two.

Next, if there is any remaining energy error, the non-moving energy level two state is adjusted to restore proper energy (step 1525). This implies that the state must accommodate units of ½ particles so that a single unit of energy can be added. The system accommodates ½ particles by employing an extra bit to the right of the decimal place for energy level zero and energy level two states (0,0,0). In the 34 state implementation, the energy level zero state is represented by 18 integral bits plus the bit to the right of the decimal point, energy level one non-dual states (e.g., (1,1,0)) are represented by 15 integral bits, energy level one dual states (e.g., (1,0,0)) are represented by 16 integral bits, energy level two non-dual states (e.g., (0,0,–2)) are represented by 15 integral bits and energy level two dual states other than (0,0,0) (e.g., (1,1,1)) are represented by 16 integral bits. Energy level two dual state (0,0,0) is represented by 16 integral bits plus a bit to the right of the decimal point.

Finally, if any mass error resulted from adjusting the non-moving energy level two state (0,0,0), the non-moving energy level zero state (0,0,0) is adjusted to restore proper mass (step 1530).

Referring again to FIG. 14, after adjusting the mass, momentum and energy, any states that are out of range are "cleaned up" to place them in range (step 1435). If this proves infeasible (step 1440), a collision-based approach is used to drive from N to $N^{OR}$ (step 1445). Both the clean up step (step 1435) and the collision-based approach (step 1445) used when the clean up step fails are based on rules referred to as ¼ rules, where ¼ is the value for the scale factor used in the rules that maximizes convergence.

The cleanup process is intended to restore all states to the non-negative range while introducing a minimal amount of disturbance (in a mean-squared sense) to the original distribution. The result is that the statistical properties of the system are well defined and the system achieves accurate hydrodynamics. Qualitatively, the cleanup process mimics the behavior of the incremental collide/over-relax process when that process fails to achieve the theoretical over-relaxed distribution ($N^{or-th}$). In that case, over-relaxation is an incremental process where a particular rule is skipped if applying the rule would leave any of its constituent states (i,j,k,l) outside the legal integer range. If rules are skipped in the collide/over-relax process, $N^{or-th}$ is not achieved, but the distribution that is achieved is, in a statistical sense, on the path from the equilibrium distribution $N^{eq}$ to $N^{or-th}$. While the final result is consistent with true hydrodynamics, the desired transport coefficients (e.g., viscosity) are not achieved.

The new approach applies the analytic prescription for over-relaxation to compute an integerized version of $N^{or-th}$. If $N^{or-th}$ includes states that are outside the legal range, ¼ rules are used to drive the out-of-range states back into range, while simultaneously driving $N^{or-th}$ towards the equilibrium distribution $N^{eq}$. So, similarly to the collide process, the final result is on the path from the equilibrium distribution to $N^{or-th}$, and is as close to $N^{or-th}$ as permitted by the integer constraints.

Each ¼ rule employs a quad (i,j,k,l) defined like the quads (i,j,k,l) used in conventional collision rules, where I, j, k, and l are state identifiers. Given a target distribution ($\overline{N}$) and an integer distribution (N) to be driven to the target distribution, the ¼-rule process may be defined as:

for rule from 1 to NUMBER_OF_RULES do $i, j, k, l$ = select a quad at random $nscatt_f$ = SCALE * (($\overline{N}_i - N_i$) + ($\overline{N}_j - N_j$) + ($N_k - \overline{N}_k$) + ($N_l - \overline{N}_l$))

$nscatt$ = round_to_integer ($nscatt_f$)

$new\_N_i = N_i + nscatt$ $new\_N_j = N_j + nscatt$ $new\_N_k = N_k - nscatt$ $new\_N_l = N_l - nscatt$ if all the new values are in range, then $N_i = new\_N_i$ $N_j = new\_N_j$ $N_k = new\_N_k$ $N_l = new\_N_l$ endif endfor The scale factor (SCALE) ranges from 0 to ½, with ½ being the limit of convergence. The round_to_integer function may be replaced with a dithering function.

Proof that the ¼-rule process causes the system to converge to the desired distribution may be established by defining an H-function that measures a deviation of N from a target value, $\overline{N}$.

$$H \equiv \sum_i (N_i - \overline{N}_i)^2.$$

H is positive-definite, and is equal to zero if and only if N equals $\overline{N}$.

A difference between two H-function values associated with a ¼ rule for a given quad (i,j,k,l) is:

$$\Delta H \equiv H' - H = (N'_i - \overline{N}_i)^2 + (N'_j - \overline{N}_j)^2 + (N'_k - \overline{N}_k)^2 + (N'_l - \overline{N}_l)^2 - (N_i - \overline{N}_i)^2 - (N_j - \overline{N}_j)^2 - (N_k - \overline{N}_k)^2 - (N_l - \overline{N}_l)^2$$

where the post-¼-rule distribution is defined as:

$N_i' = N_i - \Delta$, $N_j' = N_j - \Delta$, $N_k' = N_k + \Delta$, and $N_l' = N_l + \Delta$.

The resulting $\Delta H$ becomes:

$$\Delta H = -2\Delta[(N_i - \overline{N}_i) + (N_j - \overline{N}_j) - (N_k - \overline{N}_k) - (N_l - \overline{N}_l)] + 4\Delta^2$$

so that, for $\Delta H$ to be less than or equal to zero, it is sufficient to choose:

$$\Delta = A[(N_i - \overline{N}_i) + (N_j + \overline{N}_j) - (N_k - \overline{N}_k) - (N_l - \overline{N}_l)]$$

where the coefficient A is a chosen constant and corresponds to the scale factor. From the above form of $\Delta$, $\Delta H$ may be expressed as:

$$\Delta H = -2A(1-2A)[(N_i - \overline{N}_i) + (N_j - \overline{N}_j) - (N_k - \overline{N}_k) - (N_l - \overline{N}_l)]^2.$$

From this, it may be determined that the process will move in the direction of reducing H whenever $A(1-2A)$ is greater than zero, which simplifies to:

$$0 \leq A \leq ½.$$

The process achieves a maximal rate of convergence (i.e, the magnitude of $\Delta H$ is maximized) when the value of A equals ¼.

Although the ¼-rule process causes a convergence toward any prescribed target value $\overline{N}$, the asymptotic value of such a process is not necessarily the target value. This result occurs because each rule satisfies mass, momentum and energy constraints as well as the given integer bounds. Therefore, if the target value does not have the same mass, momentum and energy as N, or the target value is outside of a defined range (e.g., some of its components are negative), then the asymptotic value of the ¼-rule process will be the permitted value that is closest (in the mean-squared sense) to the target value. If the target satisfies all of the constraints, then the target value is the asymptotic value of the ¼-rule process, because there always exists some rules such that the allowed $\Delta$ is non-vanishing.

The cleanup process proceeds as follows. Out-of-range states may include states having negative values (underflowing states) and states having values that exceed the maximum permitted value (overflowing states).

However, for ease of explanation, the following discussion is restricted to states that are negative. For each state I that is negative, the ¼ rules that include I are used to simultaneously drive state I to zero and push $N^{int}$ along the "path" toward $N^{eq}$. If this proves infeasible for a particular state I, the process is restarted and ¼ rules are used to drive from N to $N^{OR}$.

The object is not to drive $N^{int}$ to $N^{eq}$. Rather, the object is to keep $N^{int}$ as far away from $N^{eq}$ as possible, but to cause any modifications to $N^{int}$ to move $N^{int}$ along the path to $N^{eq}$. In other words, an over-relaxed distribution is desired rather than an equilibrium distribution. However, if it is impossible to achieve the fully over-relaxed distribution, the distribution should move the shortest distance possible along the path toward equilibrium.

A detailed illustration of the technique for dealing with a state I that is negative is provided below. When the equilibrium value of one or more states is out of range, $N^{eq*}$ is used in the cleanup process. $N_i^{eq*}$ is identical to $N_i^{eq}$ except when $N_i^{eq}$ is outside the legal range, in which case, $N_i^{eq*}$ is either zero or the maximum state population, as appropriate.

If, after application of a prescribed number of ¼ rules, the values for $N^{int}$ are not within allowed ranges, the above process is stopped and a process is initiated using ¼ rules to drive from N to $N^{OR}$. In practice, this happens extremely infrequently. For example, simulation of a two-dimensional cylinder with a free-stream velocity of 0.25 lattice units and a velocity about the cylinder equator of near 0.5 lattice units requires this special processing for a few voxels per time step.

In the procedure for placing a value of $N^{int}$ within accepted ranges as presented below, there are five arguments to the MIN operator in the calculation of nscatt. The first argument, delta, is the ideal nscatt. The second argument, $-N_i^{int}$, is included to prevent $N_i^{int}$ from exceeding zero. The remaining three arguments prevent any of the states j, k, or l from being forced out of range:

for rule from 1 to NUMBER_OF_RULES do $x, j, k, l$ = select 1/4 rule involving state $I$ at random $$delta_f = 1/4 * \left( \left( N_i^{eq*} - N_i^{int} \right) + \left( N_j^{eq*} - N_j^{int} \right) + \right.$$
$$\left. \left( N_k^{int} - N_k^{eq*} \right) + \left( N_l^{int} - N_l^{eq*} \right) \right)$$

$delta$ = round_to_integer($delta_f$)

$nscatt$ = MAX(0, MIN($delta$, $-N_i^{int}$, $N_k^{int}$, $N_l^{int}$

MAX_STATE_POP $- N_j^{int}$))

$N_i^{int} = N_i^{int} + nscatt$ $N_j^{int} = N_j^{int} + nscatt$ $N_k^{int} = N_k^{int} + nscatt$ $N_l^{int} = N_l^{int} + nscatt$ if ($N_i^{int}$ == 0) exit loop endfor if ($N_i^{int}$ <> 0), cleanup failed for state $I$ so use 1/4 rules to drive from $N$ to $N^{OR}$ Thus, for randomly-selected ¼ rules that include the state I, a delta value based on ¼ of the difference between $N^{int}$ and the corrected $N^{eq}$ ($N^{eq*}$) is selected and rounded to an integer value. The integerized delta value then is adjusted to prevent other states from being sent out of range. If the ¼ rules are unsuccessful in adjusting $N^{int}$, they are used to drive directly from N to $N^{OR}$.

Other embodiments are within the scope of the following claims. For example, the non-collision-based fluid dynamics technique may be modified to employ the dynamic rates technique.

The techniques also may be applied to a fixed temperature system characterized by fewer states (e.g., 15 or 19), no concern for energy conservation, and no concern for manipulating thermal conductivity.

The techniques also may be applied to more complex systems. For example, the techniques may be applied to a system designed to simulate transonic flow speeds.

What is claimed is:

1. A computer-implemented method for simulating a physical process, comprising:
   (1) storing in a memory state vectors for voxels, the state vectors comprising entries that correspond to particular momentum states of possible momentum states at a voxel;
   (2) performing interaction operations on the state vectors, the interaction operations modeling interactions between elements of different momentum states, wherein, for a particular state vector:
      the interaction operations include performing energy-exchanging interaction operations that model interactions between elements of different momentum states that represent different energy levels, and
      a rate factor for the voxel represented by the particular state vector affects a degree to which energy-exchanging interaction operations cause a transfer of elements from states representing lower energy levels to states representing higher energy levels, rather than from states representing higher energy levels to states representing lower energy levels;
   (3) performing move operations on the state vectors to reflect movement of elements to new voxels; and
   (4) generating the rate factor for the represented voxel based on rate factors for voxels from which elements of the represented voxel moved.

2. A computer system for simulating a physical process, comprising:
   (1) means for storing in a memory state vectors for voxels, the state vectors comprising entries that correspond to particular momentum states of possible momentum states at a voxel;
   (2) means for performing interaction operations on the state vectors, the interaction operations modeling interactions between elements of different momentum states, wherein, for a particular state vector:
      the interaction operations include performing energy-exchanging interaction operations that model interactions between elements of different momentum states that represent different energy levels, and
      a rate factor for the voxel represented by the particular state vector affects a degree to which energy-exchanging interaction operations cause a transfer of elements from states representing lower energy levels to states representing higher energy levels, rather than from states representing higher energy levels to states representing lower energy levels;
   (3) means for performing move operations on the state vectors to reflect movement of elements to new voxels; and (4) means for generating the rate factor for the represented voxel based on rate factors for voxels from which elements of the represented voxel moved.

3. A computer program, residing on a computer readable medium, for a system comprising a processor, a memory, and an input device for simulating a physical process, the computer program comprising instructions for causing the processor to:

(1) store in the memory state vectors for voxels, the state vectors comprising entries that correspond to particular momentum states of possible momentum states at a voxel;

(2) perform interaction operations on the state vectors, the interaction operations modeling interactions between elements of different momentum states, wherein, for a particular state vector:

the interaction operations include performing energy-exchanging interaction operations that model interactions between elements of different momentum states that represent different energy levels, and a rate factor for the voxel represented by the particular state vector affects a degree to which energy-exchanging interaction operations cause a transfer of elements from states representing lower energy levels to states representing higher energy levels, rather than from states representing higher energy levels to states representing lower energy levels;

(3) perform move operations on the state vectors to reflect movement of elements to new voxels; and (4) generate the rate factor for the represented voxel based on rate factors for voxels from which elements of the represented voxel moved.

4. The subject matter of claims 1, 2 or 3, wherein generating the rate factor comprises generating the rate factor using a gradient of a previous rate factor for a previous time increment for the represented voxel.

5. The subject matter of claim 4, further comprising generating the gradient of the previous rate factor using an upwind differencing technique based on a velocity at the represented voxel.

6. The subject matter of claim 5, wherein using the upwind differencing technique comprises generating the gradient using the rate factors for voxels from which elements of the represented voxel moved.

7. The subject matter of claim 6, further comprising weighting the gradient of the previous rate factor based on a velocity at the represented voxel.

8. The subject matter of claim 5, further comprising weighting the gradient of the previous rate factor based on a velocity at the represented voxel.

9. The subject matter of claim 1, 2 or 3, wherein generating the rate factor comprises generating a current rate factor for the represented voxel for a current time increment and combining the current rate factor with a previous rate factor for a previous time increment.

10. The subject matter of claim 9, wherein combining the current rate factor with a previous rate factor comprises weighting contributions to the rate factor made by the current rate factor using a relaxation parameter.

11. The subject matter of claim 9, wherein the previous rate factor comprises the rate factor for the previous time increment for the represented voxel.

12. The subject matter of claim 9, wherein generating the current rate factor comprises using an approximated temperature defined as the ratio of an energy of the represented voxel to two times a density of the represented voxel.

13. The subject matter of claim 9, wherein generating the rate factor comprises generating a current rate factor for the represented voxel for a current time increment and combining the current rate factor with a previous rate factor for a previous time increment for the represented voxel and with a gradient of the previous rate factor for the previous time increment for the represented voxel.

14. The subject matter of claim 13, further comprising weighting the gradient of the previous rate factor based on a velocity at the represented voxel.

15. The subject matter of claim 13, further comprising generating the gradient of the previous rate factor using an upwind differencing technique based on a velocity at the represented voxel.

16. The subject matter of claim 15, wherein using the upwind differencing technique comprises generating the gradient using the rate factors for voxels from which elements of the represented voxel moved.

17. The subject matter of claims 1, 2 or 3, wherein generating the rate factor comprises generating the rate factor for a collection of voxels.

18. The subject matter of claims 17, wherein the collection of voxels comprises a microblock that includes eight adjacent voxels arranged in a cubic configuration.

19. The subject matter of claim 1, 2 or 3, wherein the rate factor for a voxel is related to one or more fluid properties at the voxel.

20. The subject matter of claim 19, wherein the rate factor for a voxel is related to a temperature at the voxel.

* * * * *